(12) United States Patent
Fukaura et al.

(10) Patent No.: US 11,498,505 B2
(45) Date of Patent: Nov. 15, 2022

(54) OCCUPANT PROTECTION DEVICE

(71) Applicant: TOYODA GOSEI CO., LTD., Kiyosu (JP)

(72) Inventors: Kazumi Fukaura, Kiyosu (JP); Shinji Yamada, Nagoya (JP); Takeki Hayashi, Kiyosu (JP); Atsushi Nakamura, Kiyosu (JP); Yasushi Masuda, Kiyosu (JP); Yuji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/215,020

(22) Filed: Mar. 29, 2021

(65) Prior Publication Data

US 2021/0300277 A1    Sep. 30, 2021

(30) Foreign Application Priority Data

Mar. 30, 2020  (JP) .............................. JP2020-061220
Mar. 4, 2021   (JP) .............................. JP2021-034698

(51) Int. Cl.
*B60R 21/18*    (2006.01)

(52) U.S. Cl.
CPC .................................. *B60R 21/18* (2013.01)

(58) Field of Classification Search
CPC ..................................................... B60R 21/18
See application file for complete search history.

(56) References Cited

U.S. PATENT DOCUMENTS

| | | | | |
|---|---|---|---|---|
| 5,062,662 A * | 11/1991 | Cameron | .............. | B60R 21/268 |
| | | | | 280/801.1 |
| 5,794,971 A * | 8/1998 | Boydston | ................ | B60R 21/18 |
| | | | | 280/743.1 |
| 5,863,065 A * | 1/1999 | Boydston | ................ | B60R 21/01 |
| | | | | 280/735 |
| 5,871,230 A * | 2/1999 | Lewis | ..................... | B60R 22/14 |
| | | | | 280/743.1 |
| 6,062,596 A * | 5/2000 | Boydston | ............ | B60R 21/2072 |
| | | | | 280/733 |
| 10,232,815 B1 * | 3/2019 | Dry | ........................ | B60R 21/18 |

(Continued)

FOREIGN PATENT DOCUMENTS

| | | | | |
|---|---|---|---|---|
| CN | 113459985 A * | 10/2021 | ............. | B60R 21/18 |
| DE | 19724191 A1 * | 12/1998 | ............. | B60R 21/18 |

(Continued)

*Primary Examiner* — Nicole T Verley
(74) *Attorney, Agent, or Firm* — Posz Law Group, PLC

(57) ABSTRACT

An occupant protection device, protecting an occupant seated in a seat, includes: a seat belt; and an airbag which is arranged in an area of a lap belt in the seat belt. The airbag includes a bag body and a regulatory tether. A thigh abutment surface abutting on a thigh of the occupant is arranged on a lower surface side of the bag body, and an upper body restraining surface restraining an upper body of the occupant is arranged on a rear surface side. The regulatory tether connects a base end to a rear surface side of an upper-lower intermediate portion of the bag body and connects a tip extending downward from the base end to the lap belt side and a length dimension is set a dimension in which a connecting portion connecting the base end of the bag body can be pulled toward the lap belt side.

4 Claims, 17 Drawing Sheets

(56) References Cited

U.S. PATENT DOCUMENTS

| | | | |
|---|---|---|---|
| 10,933,830 B2 * | 3/2021 | Einarsson | B60R 21/261 |
| 11,318,904 B2 * | 5/2022 | Ozaki | B60R 22/26 |
| 11,390,232 B2 * | 7/2022 | Fischer | B60N 2/002 |
| 2015/0069741 A1 * | 3/2015 | Shimazu | B60R 21/233 |
| | | | 280/729 |
| 2019/0299899 A1 | 10/2019 | Einarsson et al. | |
| 2020/0122667 A1 * | 4/2020 | Young | A44B 11/2569 |
| 2020/0122668 A1 * | 4/2020 | Ozaki | B60R 21/231 |
| 2020/0290545 A1 * | 9/2020 | Walker | B60R 21/18 |
| 2021/0094496 A1 * | 4/2021 | Tanaka | B60R 21/20 |
| 2021/0300277 A1 * | 9/2021 | Fukaura | B60R 21/2338 |
| 2021/0300278 A1 * | 9/2021 | Hayashi | B60R 21/18 |
| 2021/0300292 A1 * | 9/2021 | Yamada | B60N 2/688 |
| 2022/0048460 A1 * | 2/2022 | Yamada | B60R 21/233 |

FOREIGN PATENT DOCUMENTS

| | | | | |
|---|---|---|---|---|
| JP | 2020066425 A * | 4/2020 | | B60R 21/00 |
| JP | 2021054250 A * | 4/2021 | | B60R 21/18 |
| JP | 2021160710 A * | 10/2021 | | B60R 21/18 |
| JP | 2022032920 A * | 2/2022 | | B60R 21/207 |
| WO | WO-9747498 A1 * | 12/1997 | | B60R 21/18 |
| WO | WO-9856619 A1 * | 12/1998 | | B60R 21/18 |
| WO | WO-9944865 A1 * | 9/1999 | | B60R 21/017 |
| WO | WO-0100456 A1 * | 1/2001 | | B60R 21/18 |

\* cited by examiner

A-A PART SCHEMATIC CROSS SECTION

OCCUPANT PROTECTION DEVICE

CROSS-REFERENCE TO RELATED APPLICATION(S)

This application is based upon and claims the benefit of priority from prior Japanese patent applications No. 2020-061220 filed on Mar. 30, 2020, and No. 2021-034698 filed on Mar. 4, 2021, the entire contents of which are incorporated herein by reference.

BACKGROUND

1. Field of the Invention

The present invention relates to an occupant protection device for protecting an occupant seated on a seat.

2. Description of the Related Art

In a recent year, as an occupant protection device, there is provided a device having a configuration in which a holder for accommodating and holding a folded airbag is set in front of a waist of an occupant seated on a seat (see, for example, U.S. Patent Application Publication No. 2019/299899). In this occupant protection device of the related art, the airbag inflates so as to protrude forward and upward from the holder when operated, and when the inflation is completed, the airbag is configured to cover from an upper surface of a thigh of the occupant to a front surface of an upper body.

However, in the occupant protection device of the related art, since the airbag simply inflates so as to protrude forward and upward from the holder, a gap may be created between the airbag and the occupant when the inflation is completed. Therefore, there is room for improvement in quickly protecting the occupant.

SUMMARY

The invention solves the problem described above and an object thereof is to provide an occupant protection device capable of quickly protecting an occupant by an airbag that has completed inflation.

According to an aspect of the invention, there is provided an occupant protection device which protects an occupant seated in a seat, including: a seat belt; and an airbag which is arranged in an area of a lap belt in the seat belt which restrains a waist of the occupant when worn and inflates so as to cover a front side of the occupant when operated, where: the airbag includes a bag body which inflates so that inflation gas flows into the inside when operated and projects forward and upward and a regulatory tether which regulates a position of the bag body when inflation is completed; a thigh abutment surface capable of abutting on a thigh of the occupant is arranged on a lower surface side of the bag body when the inflation is completed and an upper body restraining surface capable of restraining an upper body of the occupant is arranged on a rear surface side when the inflation is completed; and the regulatory tether connects a base end to a rear surface side of an upper-lower intermediate portion of the bag body when the inflation is completed and connects a tip extending downward from the base end to the lap belt side and a length dimension is set a dimension in which a connecting portion connecting the base end of the bag body can be pulled toward the lap belt side.

In the occupant protection device of the invention, when the inflation of the airbag is completed, by the regulatory tether, the bag body which has completed inflation can be pulled to the rear side that is the occupant side, and thus the bag body can be prevented from inflating away from the occupant. Specifically, in the occupant protection device of invention, the regulatory tether connects the base end to the upper-lower intermediate portion on the rear surface side of the bag body, and the connecting portion (that is, the up-down intermediate portion of the rear upper surface side in the bag body) of the bag body connecting the base end is pulled toward the lap belt side, that is, downward, and thus the upper body restraining surface arranged on the rear surface side of the bag body at the completion of inflation can be arranged so as to be close to the occupant side. Therefore, in particular, it is possible to prevent the region on the upper end side of the upper body restraining surface from being arranged so as to be largely separated from the occupant in the forward direction. Therefore, the upper body restraining surface can quickly restrain the upper body of the occupant. Also, when the upper body is restrained by this upper body restraining surface, the bag body is arranged on the front side of the upper body of the occupant while making the thigh abutment surface on the lower surface side abut on the upper surface of the thigh of the occupant. As a result, since the thigh abutment surface is supported by the thigh over a wide area, the bag body is suppressed from collapsing and compression, and thus the upper body (from the chest to the head) of the occupant can be accurately restrained by the upper body restraining surface.

Therefore, in the occupant protection device of the invention, the occupant can be quickly protected by the airbag which has completed the inflation.

Further, the occupant protection device may have the following configuration.

According to another aspect of the invention, there is provided an occupant protection device which protects an occupant seated in a seat, including: a seat belt; and an airbag which is arranged in an area of a lap belt in the seat belt which restrains a waist of the occupant when worn and inflates so as to cover a front side of the occupant when operated, where: the airbag includes a bag body which inflates so that inflation gas flows into the inside when operated and projects forward and upward and a regulatory tether which regulates a position of the bag body when inflation is completed; a thigh abutment surface capable of abutting on a thigh of the occupant is arranged on a lower surface side of the bag body when the inflation is completed and an upper body restraining surface capable of restraining an upper body of the occupant is arranged on a rear surface side when the inflation is completed; and the regulatory tethers are arranged on both left and right sides of the bag body when the inflation is completed and each of the regulatory tethers connects a base end to a side surface side of the bag body when the inflation is completed and connects a tip to a side surface side of the seat arranged rearward and downward from the base end.

In the occupant protection device with such a configuration, when the inflation of the airbag is completed, the pair of left and right regulatory tethers can pull the bag body which has completed the inflation to the rear side, which is the occupant side, and thus it is possible to prevent the bag body from expanding away from the occupant. Specifically, in the occupant protection device with the configuration described above, the regulatory tethers are arranged so as to extend from both the left and right sides of the bag body and the tip is connected to the side surface side of the seat arranged rearward and downward from the base end. Therefore, the forward movement of both left and right edge sides on the rear surface of the bag body can be accurately regulated by the regulatory tethers, and thus the bag body can be pulled to the rear side, which is the occupant side, in a well-balanced manner on the left and right. As a result, the upper body restraining surface arranged on the rear surface side of the bag body at the completion of inflation can be arranged so as to be close to the occupant side. Further, when the inflation is completed, the bag body is arranged in front of the upper body of the occupant while bringing the thigh abutment surface on the lower surface side into contact with the upper surface of the thigh of the occupant. Therefore, since the bag body makes the thigh abutment surface supported over a wide area by the thigh, collapse and compression are suppressed. As a result, the upper body (from the chest to the head) of the occupant can be accurately restrained by the upper body restraining surface. Further, in the occupant protection device with the configuration described above, since the regulatory tethers are connected to the side surface sides of the seat on the tip side, the position of the bag body with respect to the seat can also be regulated. As a result, with the bag body which has completed the inflation, the waist of the occupant can also be restrained to regulate the forward movement.

Therefore, even in the occupant protection device with such a configuration, the occupant can be quickly protected by the airbag which has completed the inflation.

In the occupant protection device of the configuration described above, it is preferable that the regulatory tethers be configured to respectively connect the base ends to left and right side surface sides of the bag body in a region on an upper side of the upper body restraining surface. The reason is as follows. A forward movement of the upper region on the left and right side surface sides of the bag body can be accurately regulated by the regulatory tether, and thus the bag body can be pulled more stably to a rear side, which is the occupant side. As a result, the upper body restraining surface, which is placed on a rear surface side of the bag body when the inflation is completed, can be placed widely and stably in an up-down direction so that it approaches the occupant side.

Specifically, in the occupant protection device of the configuration described above, it is preferable that the bag body have a substantially triangular prism shape in which an axial direction is substantially along a left-right direction as an outer shape when inflation is completed and be configured to include a front wall portion, which is arranged on a front side away from the occupant when the inflation is completed, a rear upper wall portion and a rear lower wall portion arranged on the occupant side when the inflation is completed, and a left wall portion and a right wall portion, which are arranged so as to face each other on a left-right direction side when the inflation is completed, the upper body restraining surface be composed of the rear upper wall portion, the thigh abutment surface be composed of the rear lower wall portion, the bag body be configured to be formed by binding peripheral edges of two base materials, an occupant side panel and a front side panel, to each other, the occupant side panel be configured to include, an upper part forming the rear upper wall portion and regions on rear upper sides in the left wall portion and the right wall portion, and a lower part forming the rear lower wall portion and regions on rear lower sides in the left wall portion and the right wall portion, the front side panel forming the front wall portion and regions on front sides in the left wall portion and the right wall portion, and the regulatory tether be configured to bind the base end to a region of a binding part which binds peripheral edges of the front side panel and the upper part.

When the occupant protection device has the configuration described above, the base end of the regulatory tether is not bound to the peripheral wall which inflates by inflowing inflation gas into the bag body, but to the region of the binding part which connects the outer peripheral edges of the base materials which form the peripheral walls, and thus the state of binding of the base end of the regulatory tether to the bag body side at the time of inflation of the airbag can be stabilized. Therefore, the position of the bag body at the time of completion of inflation can be stably regulated by the regulatory tether. In addition, the binding part of the base end of the regulatory tether to the bag body is formed not in the part of the peripheral wall alone where there is a risk of gas leakage, but in the region of the binding part between the inflating peripheral walls of the bag body. Therefore, the risk of gas leakage can be suppressed and the base end of the regulatory tether can be bound to the bag body.

In the occupant protection device according to the above, the airbag may include a rear tether which is located on a rear surface side of the bag body, and the rear tether may connect a base end to a rear surface side of an upper-lower intermediate portion of the bag body when the inflation is completed and connect a tip extending downward from the base end to the lap belt side, and a length dimension may be set a dimension in which a connecting portion connecting the base end of the bag body can be pulled toward the lap belt side.

When the occupant protection device has such a configuration, the position of the bag body at the completion of inflation can be regulated by the rear tether in addition to the regulation by the pair of left and right regulatory tethers. In detail, in the occupant protection device with such a configuration, by the rear tether connecting the base end to the upper-lower intermediate portion on the rear surface side of the bag body, the connecting portion (up-down intermediate portion of the rear surface side in the bag body) of the bag body connecting the base end can be pulled toward the lap belt side, that is, downward. Therefore, in addition to being able to pull the bag body to the rear side, which is the occupant side, in a well-balanced manner on the left and right by the regulatory tethers extending from the left and right side surface sides, the rear tether allows the upper body restraining surface, which is arranged on the rear surface side of the bag body when the inflation is completed, to be arranged so as to be close to the occupant side. Therefore, in particular, it is possible to prevent the region on the upper end side of the upper body restraining surface from being arranged so as to be largely separated from the occupant in the forward direction. As a result, in the occupant protection device with the configuration described above, the upper body of the occupant can be quickly and stably restrained by the upper body restraining surface when the inflation of the airbag is completed.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment of the invention will be described with reference to the drawings. In the embodiment, the front-rear, up-down, and left-right directions coincide with the front-rear, up-down, and left-right directions of a seat unless otherwise specified.

Figure 1:
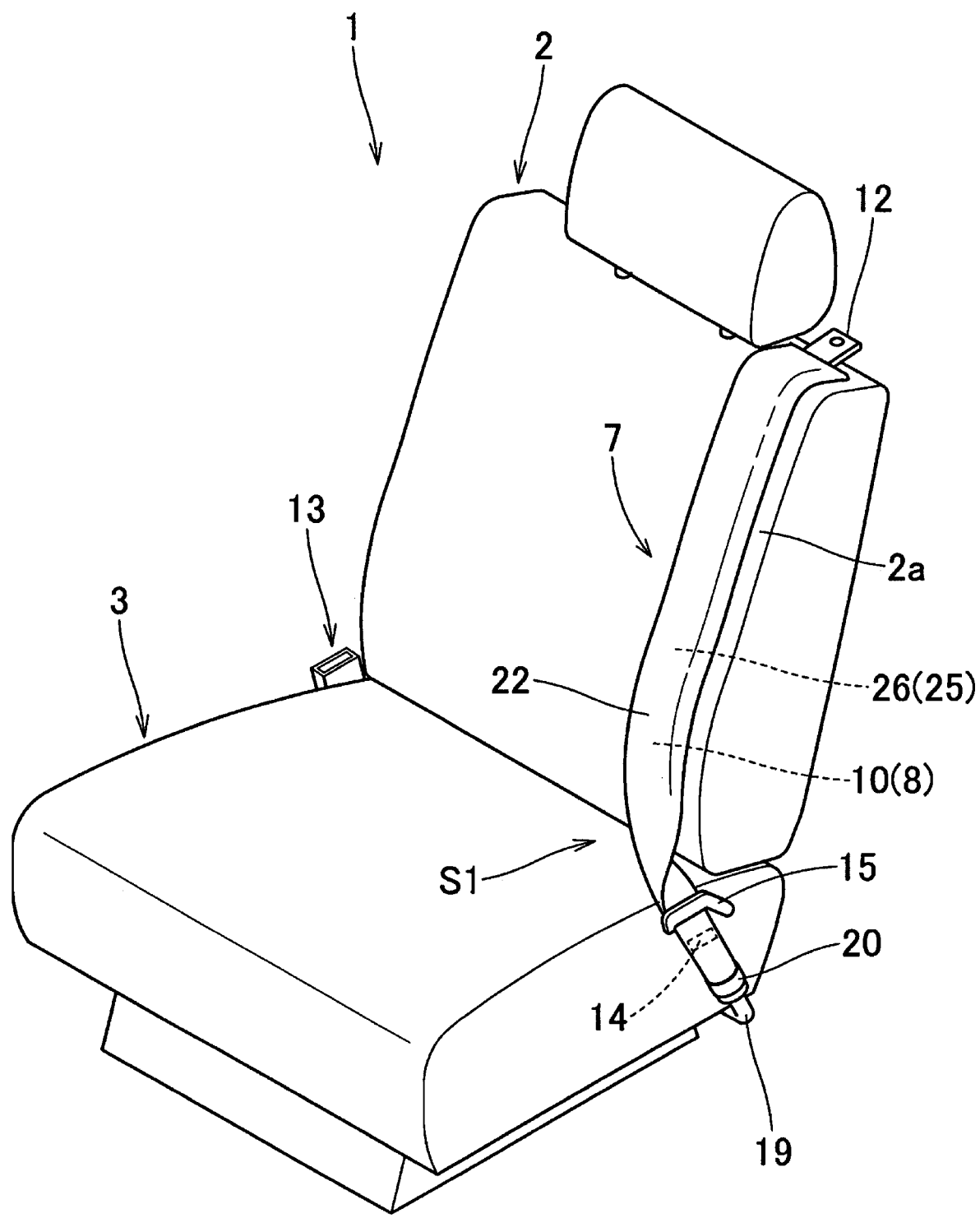
FIG. 1 is a perspective view of a seat on which an occupant protection device according to a first embodiment of the invention is mounted.
Figure 2:
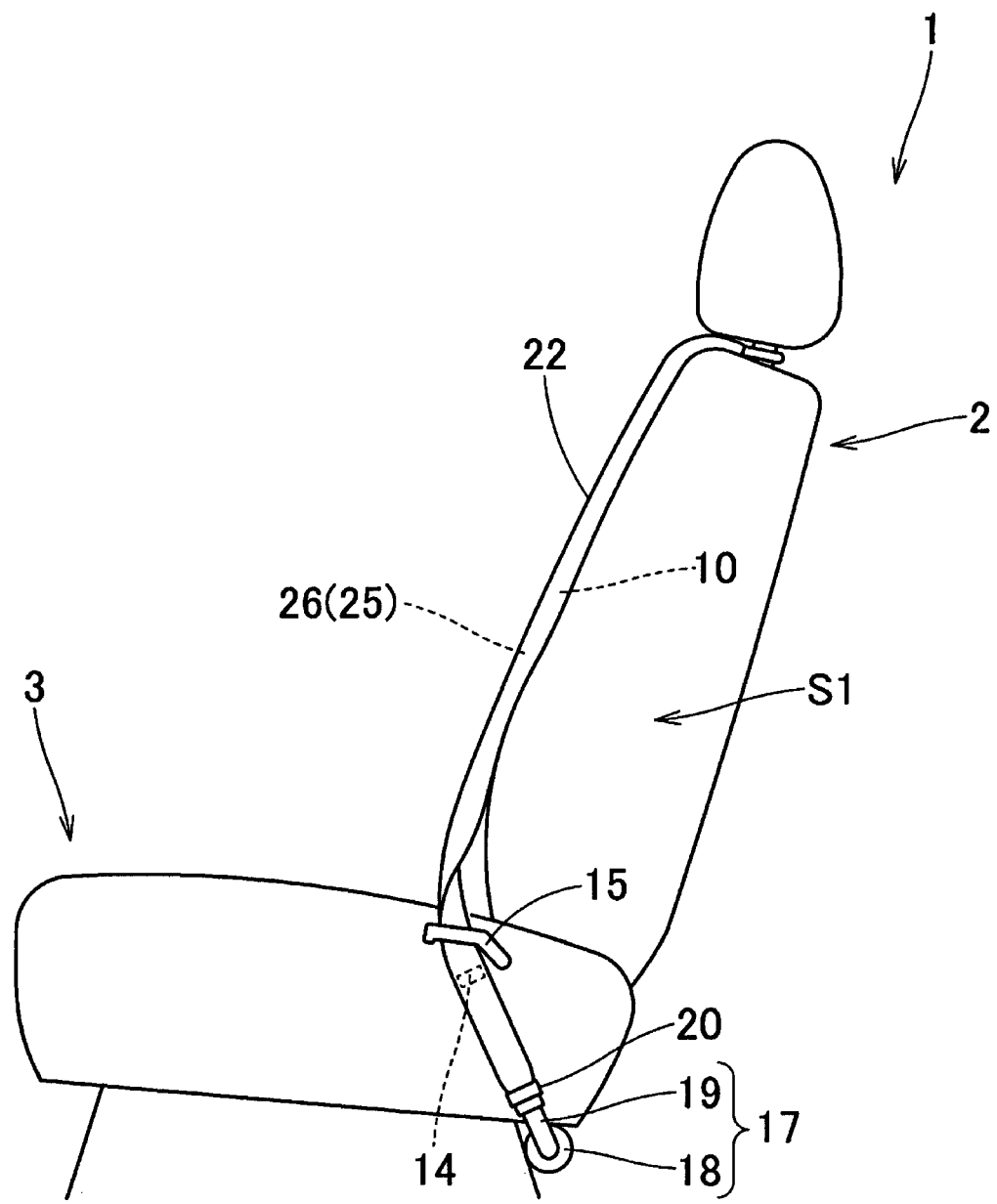
FIG. 2 is a side view of the sheet of FIG. 1.

First, an occupant protection device S1 of a first embodiment will be described. The occupant protection device S1 of the first embodiment is mounted on a seat 1 of a vehicle and has a configuration including a seat belt 7, an airbag 25, and an inflator 17, as illustrated in FIGS. 1 and 2. The seat 1 includes a backrest portion 2 and a seat portion 3.

The seat belt 7 is configured to include a belt body 8 for restraining an occupant MP seated on the seat 1, a tongue plate 12 attached to the belt body 8, and a buckle 13 for connecting the tongue plate 12. One end of the belt body 8 is locked to a take-up shaft of a retractor (not illustrated) arranged in the backrest portion 2 and the other end is locked to an anchor member 14 (see FIGS. 1 and 2) arranged on a left side of a rear end of the seat portion 3 in the seat 1. Specifically, the belt body 8 is arranged so as to be exposed to the outside from an upper left edge side of the backrest portion 2. In the case of the embodiment, in the non-seat state of the occupant, as illustrated in FIGS. 1 and 2, the belt body 8 is configured to expose a lap belt 10 for accommodating the airbag 25 to the front surface of the backrest portion 2. The belt body 8 includes the lap belt 10 and a shoulder belt 9 accommodated in the backrest portion 2. In a state where the tongue plate 12 is connected to the buckle 13 when the occupant is seated, a lower body MD (waist) of the occupant MP is restrained by the lap belt 10 arranged substantially along the left-right direction between the anchor member 14 and the buckle 13 and an upper body MU (from the shoulder to the chest) of the occupant MP is restrained by the shoulder belt 9 which extends diagonally from an upper left edge side of the backrest portion 2 to the buckle 13 (see FIG. 3). For details, as illustrated in FIG. 1, the lap belt 10 is exposed to the front surface of the backrest portion 2 on a left edge 2a side of the backrest portion 2 so as to substantially follow the up-down direction in a non-seat state of the occupant MP.

The inflator 17 is arranged at a position below the seating surface of the seat portion 3 in the seat 1. In the case of the embodiment, as illustrated in FIG. 1, the inflator 17 includes an inflator body 18 (detailed illustration is not shown) and a pipe portion 19 extending from the inflator body 18 and supplying inflation gas to the airbag 25. The pipe portion 19 extends from the inflator body 18 and is arranged so that the tip thereof is located on the left side of the seat 1 near a boundary portion between the seat portion 3 and the backrest portion 2. The tip of the pipe portion 19 is connected to a conduit portion 40 described below in the airbag 25 by using a clamp 20 (see FIG. 7).

Figure 3:
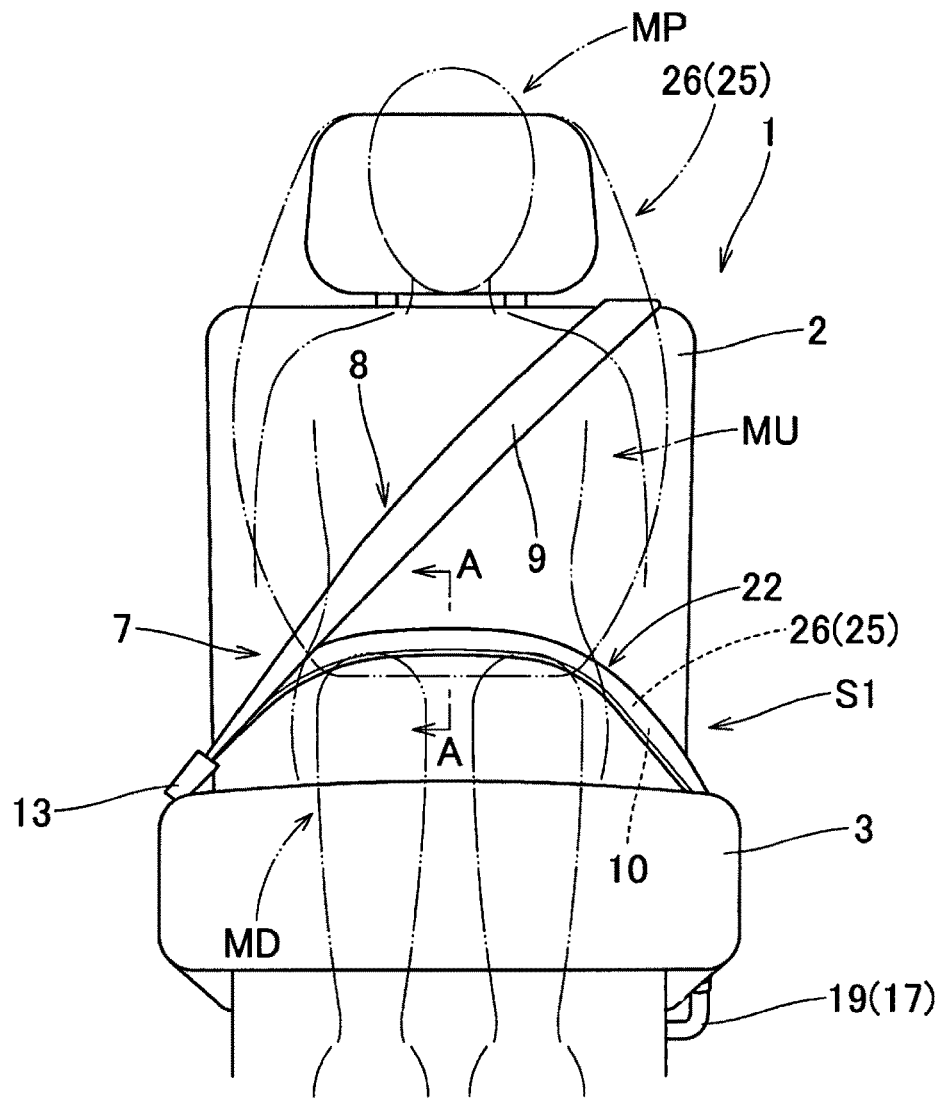
FIG. 3 is a front view of the seat of FIG. 1 and illustrates a state in which a seat belt is fastened.
Figure 3:
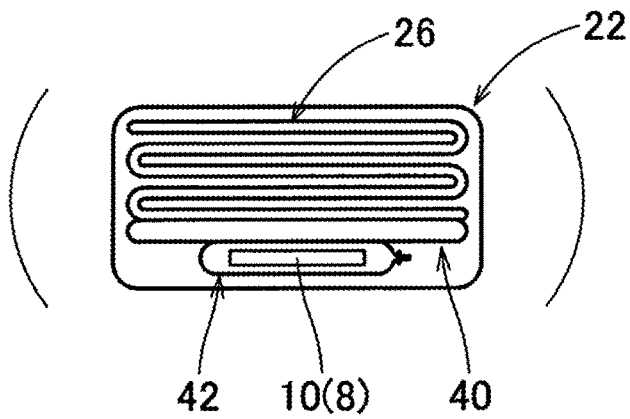
Figure 4:
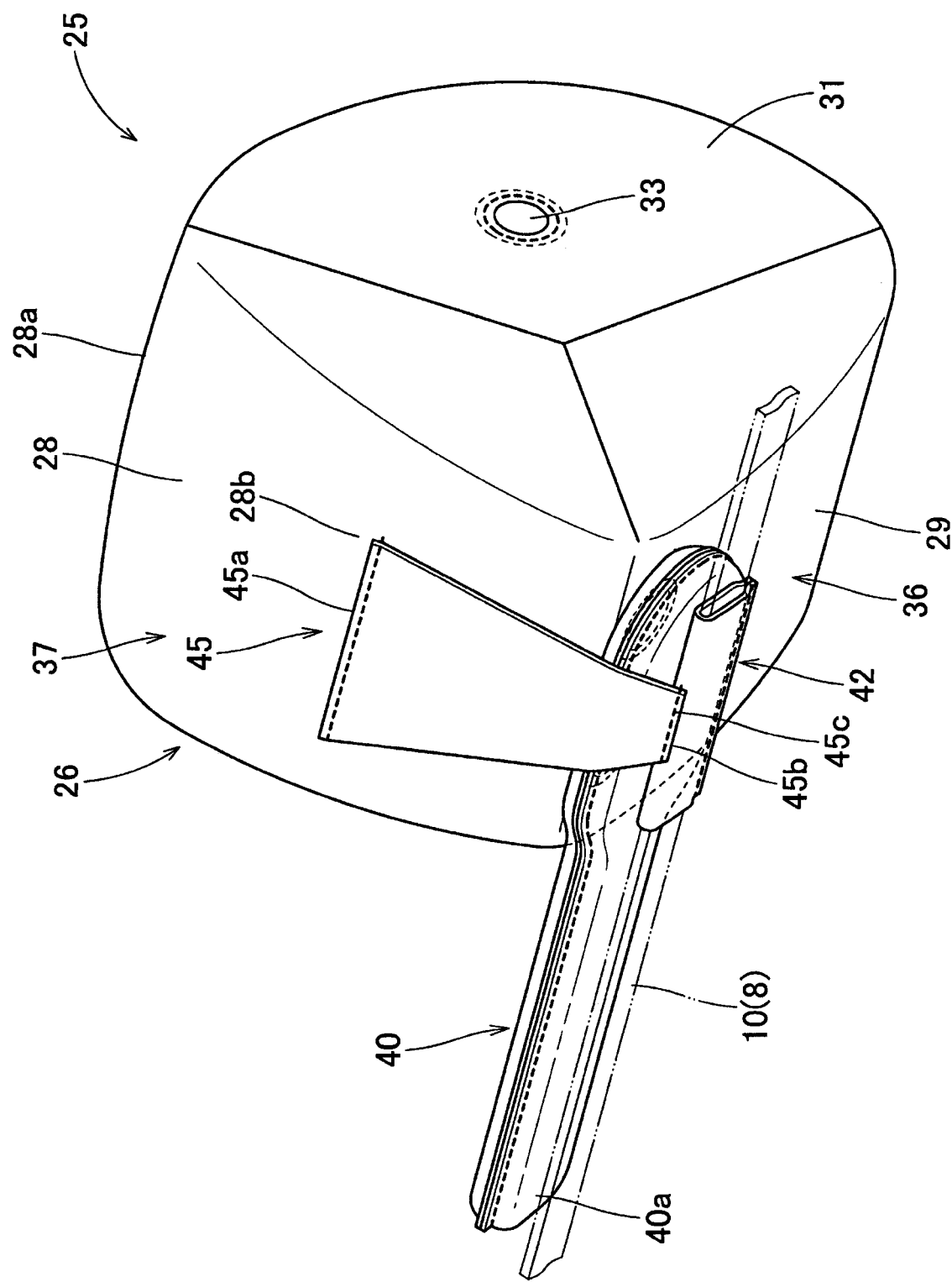
FIG. 4 is a schematic perspective view illustrating a state in which an airbag used in the occupant protection device of FIG. 1 is inflated by itself.
Figure 5A:
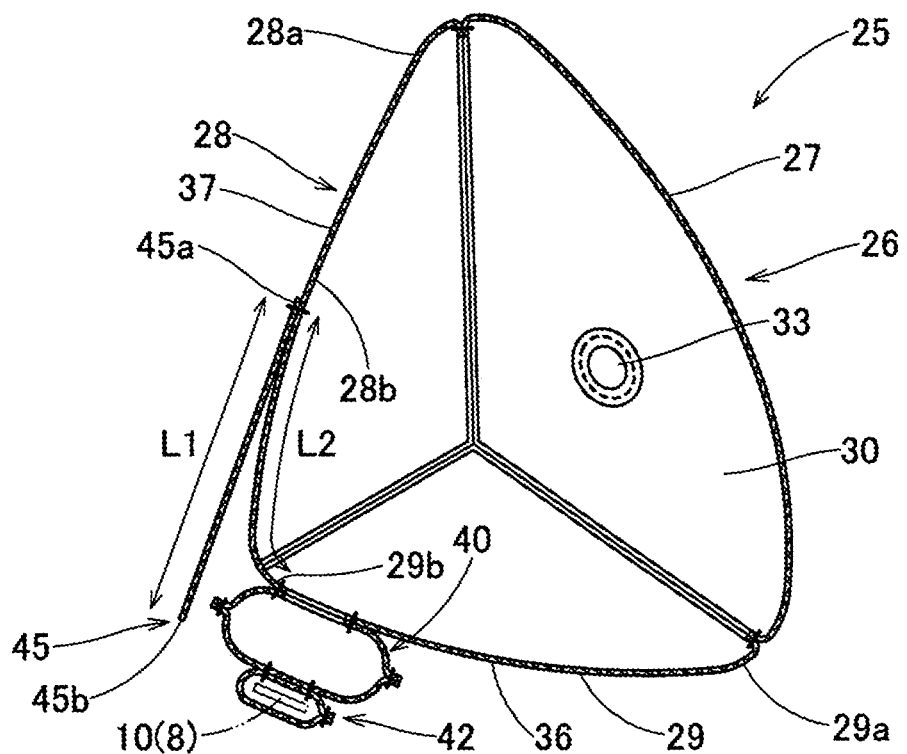
FIGS. 5A and 5B are schematic vertical cross-sectional views of the airbag of FIG. 4 and illustrate a state before sewing and a state after sewing to a belt attachment portion of a tip of a regulation tether.
Figure 5B:
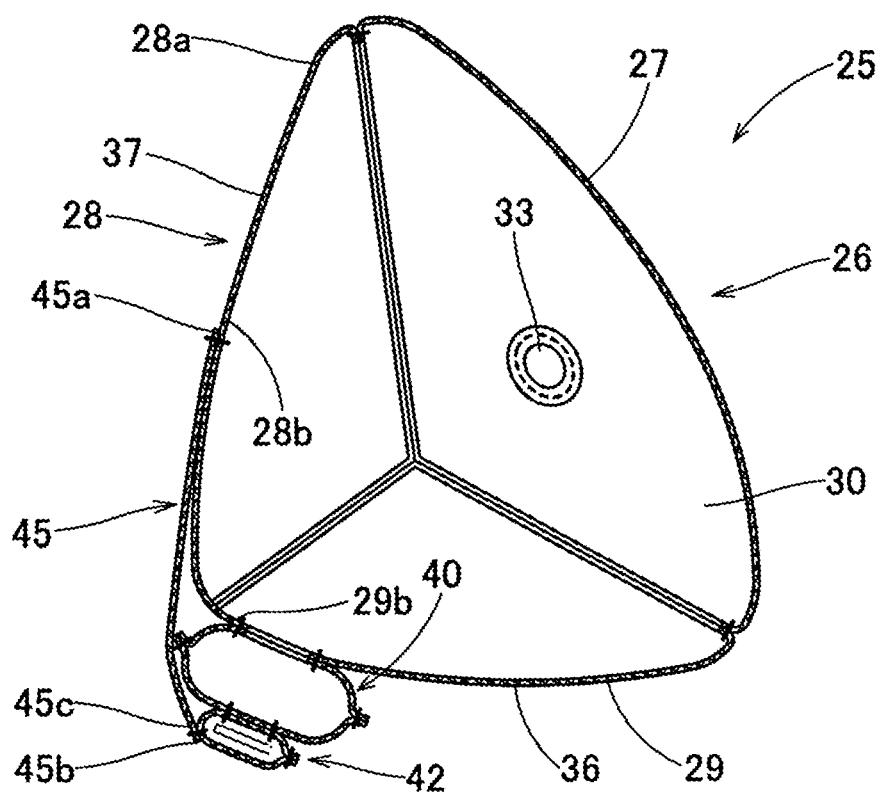

The airbag 25 is in the shape of a bag composed of a flexible sheet body. As illustrated in FIGS. 4, 5A, and 5B, the airbag 25 includes a bag body 26, the conduit portion 40 which is connected to the inflator 17 and allows the inflation gas to flow into the bag body 26, a belt attachment portion 42 for connecting the bag body 26 to the lap belt 10, and a regulatory tether 45 which regulates the position of the bag body 26 when inflation is completed. In the case of the embodiment, the airbag 25 is arranged in the area of the lap belt 10 so that the bag body 26 and the regulatory tether 45 are folded in a long shape and overlapped on the upper surface side of the lap belt 10 when the seat belt 7 is worn (see FIG. 3). That is, in the non-worn state as illustrated in FIGS. 1 and 2, the airbag 25 (folded bag body 26, the regulatory tether 45, and the conduit portion 40) is located on a back side (backrest portion 2 side) of the lap belt 10. In the case of the embodiment, the folded airbag 25 and the lap belt 10 are integrated by being peripherally covered with a cover 22 which can be broken when the airbag 25 is developed and inflated, as illustrated in FIG. 3.

Figure 6:
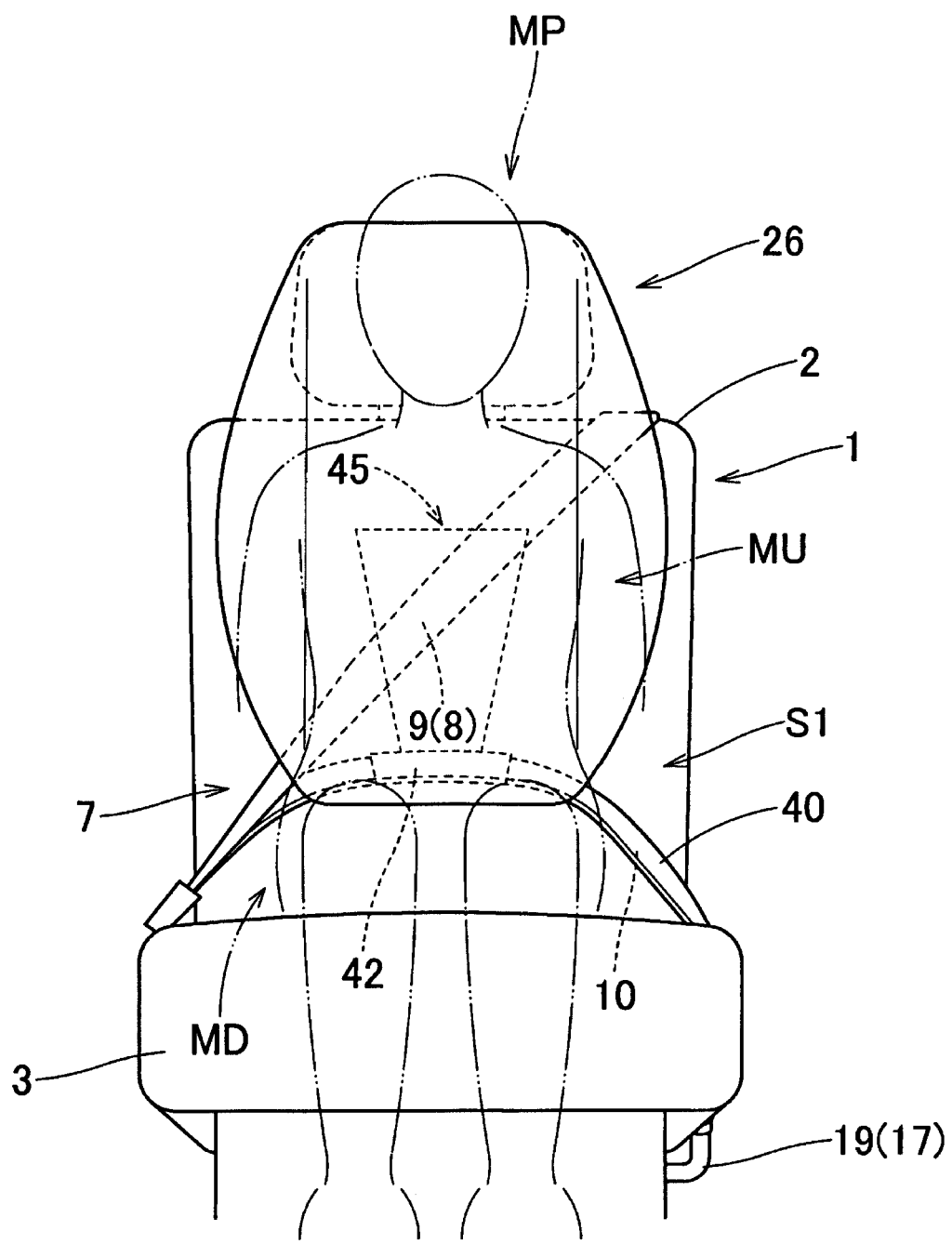
FIG. 6 is a front view of a seat in a state in which the airbag completes inflation in the occupant protection device of the first embodiment.

In the case of the embodiment, in the bag body 26, an external shape when inflation is completed has a substantially triangular prism shape in which an axial direction is substantially along the left-right direction, as illustrated in FIGS. 4, 5A, and 5B. To be described in detail, the bag body 26 has a substantially right-angled triangular shape having a hypotenuse on the front side in an inflation completed shape when viewed from the left and right sides and the inflation completed shape when viewed from the front-back direction side is configured to be a substantially rectangular shape widened vertically (see FIGS. 6 and 7). The bag body 26 is configured to include a front wall portion 27 which is arranged on the front side away from the occupant MP when the inflation is completed, a rear upper wall portion 28 and a rear lower wall portion 29 arranged on the occupant MP side when the inflation is completed, and a left wall portion 30 and a right wall portion 31 which are arranged to face each other on the left-right direction side when the inflation is completed (see FIGS. 4 and 5A and 5B). Then, in the bag body 26 of the embodiment, the rear lower wall portion 29 forms a thigh abutment surface 36 capable of contacting a thigh MT of the occupant MP when the inflation is completed and the rear upper wall portion 28 forms an upper body restraining surface 37 which is arranged in front of the occupant MP when the inflation is completed and can restrain the upper body MU (from a chest MB to a head MH) of the occupant MP. Specifically, in the case of the embodiment, in the bag body 26, a width dimension on the left-right side at the completion of inflation is set to be smaller than that of the backrest portion 2 of the seat 1 and is set to be equivalent to that of the upper body MU so as to be able to stably protect the upper body MU of the occupant MP (see FIG. 6). Further, the rear upper wall portion 28 and the rear lower wall portion 29 are arranged so as to be substantially orthogonal to each other. In the case of the embodiment, the rear lower wall portion 29 (thigh abutment surface 36) has a front end 29a located further on a front side than the thigh MT of the occupant MP. Further, in the case of the embodiment, the rear upper wall portion 28 (upper body restraining surface 37) has an upper end 28a located at a position in front of the head MH of the occupant MP (see FIG. 7). The bag body 26 is provided with vent holes 33 for exhausting excess inflation gas which has flowed into the bag body at the left wall portion 30 and the right wall portion 31. Further, the bag body 26 is communicated with the conduit portion 40 at the rear lower end side portion (portion on a rear end 29b side of the rear lower wall portion 29) when the inflation is completed through a communication hole (diagram code thereof is not shown) (see FIGS. 5A and 5B).

The conduit portion 40 is configured to extend to the left from the bag body 26. The conduit portion 40 is connected to the pipe portion 19 of the inflator 17 as a substantially tubular shape with a tip 40a side open and is arranged substantially along the lap belt 10 in the left-right direction when the inflation of the airbag 25 is completed. The conduit portion 40 has a configuration in which the tip 40a side is connected to the pipe portion 19 of the inflator 17 by using the clamp 20 as described above. Further, in the case of the embodiment, the region near the tip 40a of the conduit portion 40 is configured such that an outer surface side (left side surface side in the embodiment) is pressed by a pressing member 15 extending from the seat 1 side (see FIG. 7). As illustrated in FIGS. 4, 5A, and 5B, the belt attachment portion 42 for connecting the bag body 26 to the lap belt 10 is arranged on the lower surface side of the conduit portion 40. The belt attachment portion 42 has a substantially tubular shape with both ends open so that the lap belt 10 can be inserted (see FIG. 4).

The regulatory tether 45 is arranged on the rear surface side of the bag body 26. In the regulatory tether 45, a base end 45a is connected to the rear surface side in an upper-lower intermediate portion of the bag body 26 when the inflation is completed and a tip 45b extending downward from the base end 45a is used as a connecting portion 45c and is connected to the lap belt 10 side (see FIGS. 4, 5A, and 5B). In detail, the regulatory tether 45 has a substantially trapezoidal shape in which the base end 45a side is wide and the tip 45b side is narrow. Specifically, the width dimension on the base end 45a side is set to about ⅓ of the width dimension on the left-right direction side of the bag body 26 (see FIG. 6). Then, in the regulatory tether 45, the base end 45a arranged substantially along the left-right direction is sewn to a central portion 28b of the rear upper wall portion 28 which is substantially a vertical center on the rear surface side of the bag body 26 over the entire length using suture so as to make the left-right center substantially coincide with the left-right center (left-right center of the rear upper wall portion 28) of the bag body 26. Further, the regulatory tether 45 is configured to be connected to the lap belt 10 side as the connecting portion 45c by sewing the tip 45b to the belt attachment portion 42. Specifically, the tip 45b (connecting portion 45c) of the regulatory tether 45 is sewn (connected) to the vicinity of the rear end of the belt attachment portion 42 using suture (see FIG. 4). As illustrated in FIG. 5A, in this regulatory tether 45, the length dimension (separation distance between the base end 45a and the tip 45b (connecting portion 45c)) is set so that the connecting portion (central portion 28b of the rear upper wall portion 28) connecting the base end 45a in the bag body 26 when the inflation of the airbag 25 is completed can be pulled to the lap belt 10 side. Specifically, in the case of the embodiment, a length dimension L1 of the regulatory tether 45 is configured to be smaller than a length L2 of the film length from the central portion 28b to the conduit portion 40 in the cross section of the bag body 26 in the inflated state along the front-rear direction (see FIG. 5A). Then, as illustrated in FIGS. 5A and 5B, in the bag body 26, by sewing the connecting portion 45c on the tip 45b side of the regulatory tether 45 to the belt attachment portion 42, the central portion 28b is pulled by the regulatory tether 45 to the lap belt 10 side (belt attachment portion 42 side). Therefore, compared with the state before sewing of this tip 45b (connecting portion 45c) to the belt attachment portion 42, the rear upper wall portion 28 is tilted so as to be substantially along the up-down direction.

In the occupant protection device S1 of the first embodiment, when the inflator 17 is operated while mounted on the vehicle, the inflation gas discharged from the inflator 17 will flow into the bag body 26 via the conduit portion 40. Therefore, the bag body 26 ruptures the cover 22 and projects forward and upward from the lap belt 10 to complete the inflation as illustrated by the alternate long and short dash line in FIG. 3 and FIGS. 6 and 7.

Figure 7:
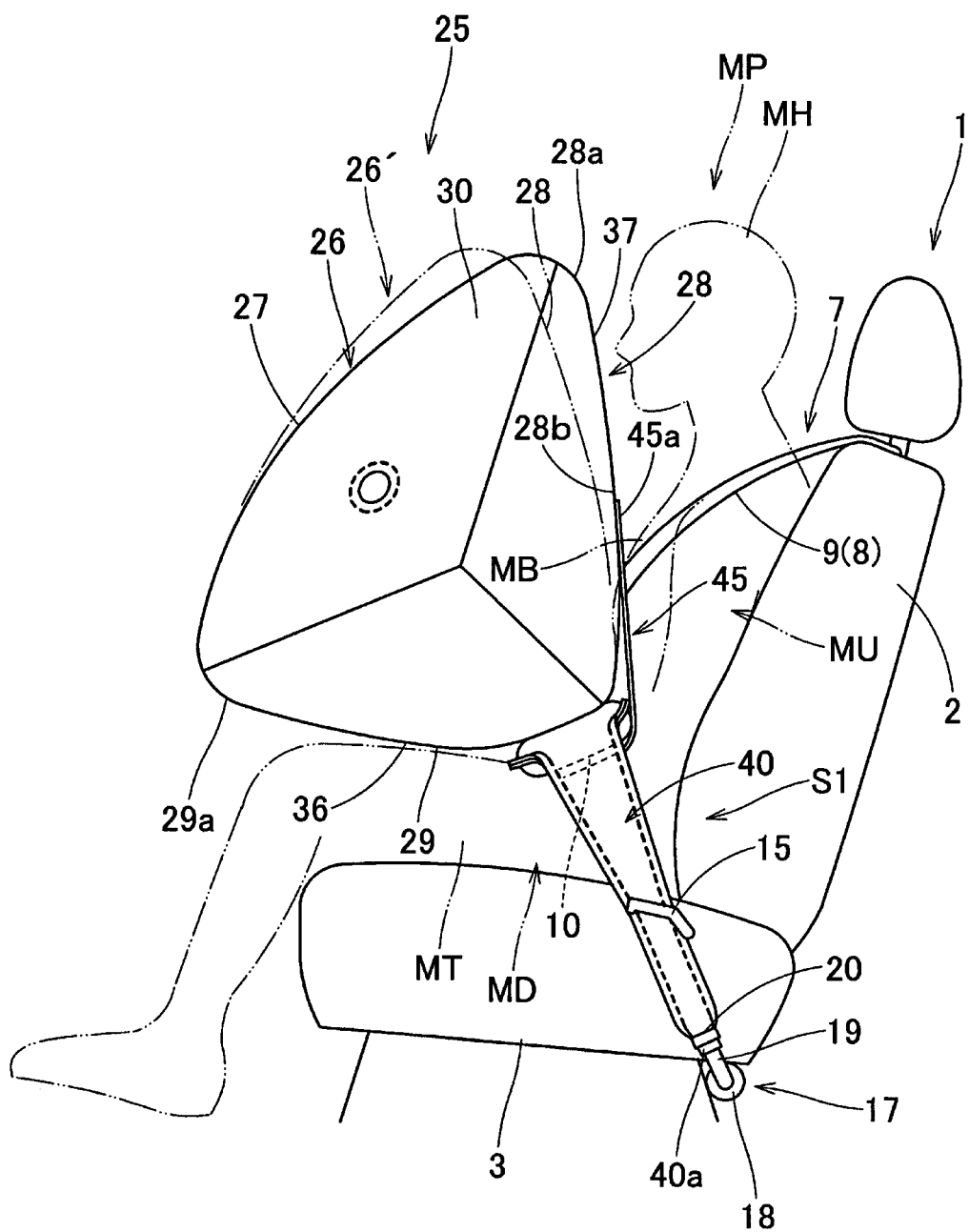
FIG. 7 is a side view of the seat in the state in which the airbag completes the inflation in the occupant protection device of the first embodiment.

Then, in the occupant protection device S1 of the first embodiment, when the inflation of the airbag 25 is completed, by the regulatory tether 45, the bag body 26 which has completed inflation can be pulled to the rear side that is the occupant MP side, and thus the bag body 26 can be prevented from inflating away from the occupant MP. Specifically, in the occupant protection device S1 of the first embodiment, the regulatory tether 45 connects the base end 45a to the upper-lower intermediate portion on the rear surface side of the bag body 26, and the connecting portion (that is, in the case of the embodiment, the central portion 28b of the rear upper wall portion 28 in the bag body 26) of the bag body 26 connecting the base end 45a is pulled toward the lap belt 10 side, that is, downward, and thus as illustrated in FIG. 7, the upper body restraining surface 37 arranged on the rear surface side of the bag body 26 at the completion of inflation can be arranged so as to be close to the occupant MP side. Therefore, in particular, it is possible to prevent the region on the upper end side (upper end 28a side of the rear upper wall portion 28) of the upper body restraining surface 37 from being arranged so as to be largely separated from the occupant MP in the forward direction. Therefore, the upper body restraining surface 37 can quickly restrain the upper body MU of the occupant MP.

Figure 8:
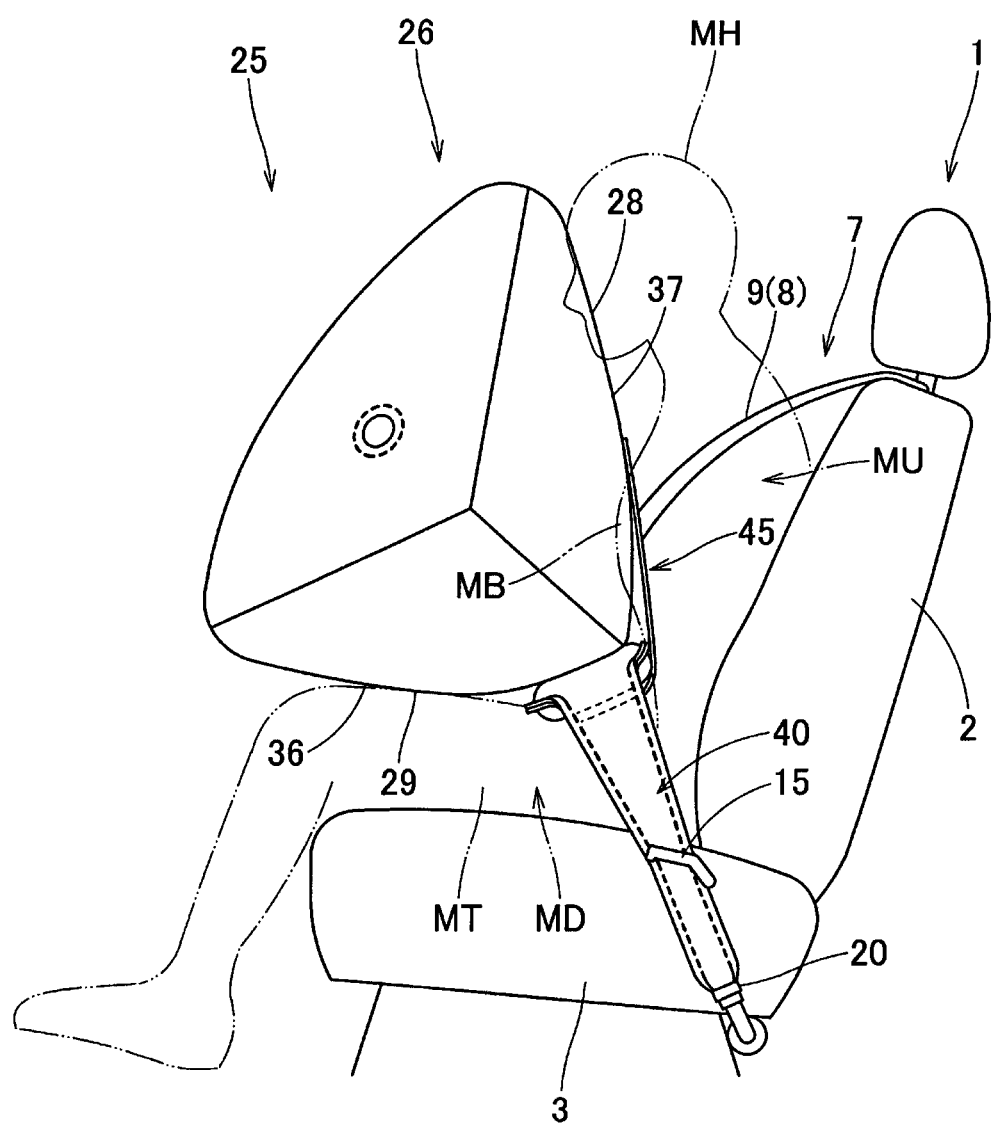
FIG. 8 is a side view illustrating a state in which an occupant is restrained by the airbag that completes the inflation in the occupant protection device of the first embodiment.

Also, when the upper body MU is restrained by this upper body restraining surface 37, the bag body 26 is arranged on the front side of the upper body MU of the occupant MP while making the thigh abutment surface 36 on the lower surface side abut on the upper surface of the thigh MT of the occupant MP. As a result, since the thigh abutment surface 36 is supported by the thigh MT over a wide area, the bag body 26 is suppressed from collapsing and compression, and thus the upper body MU (from the chest MB to the head MH) of the occupant MP can be accurately restrained by the upper body restraining surface 37 (see FIG. 8). By the way, in the case where the regulatory tether is not provided, as illustrated by the alternate long and short dash line in FIG. 7, a rear upper wall portion 28' of the bag body 26' is arranged so as to be inclined so that the upper end faces forward.

Therefore, in the occupant protection device S1 of the first embodiment, the occupant MP can be quickly protected by the airbag 25 which has completed the inflation.

Figure 9:
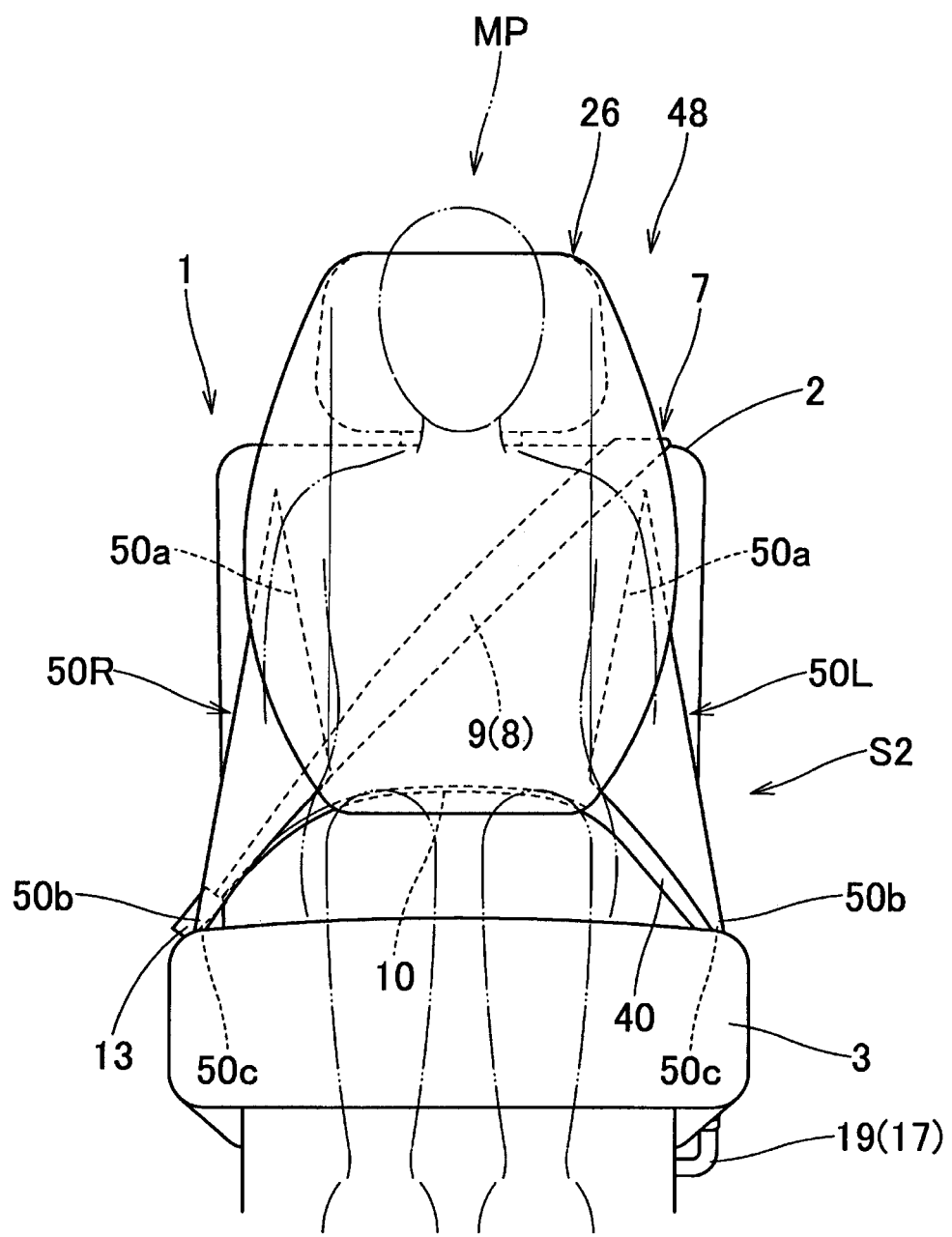
FIG. 9 is a front view of a seat in a state in which an airbag completes inflation in an occupant protection device according to a second embodiment of the invention.
Figure 10:
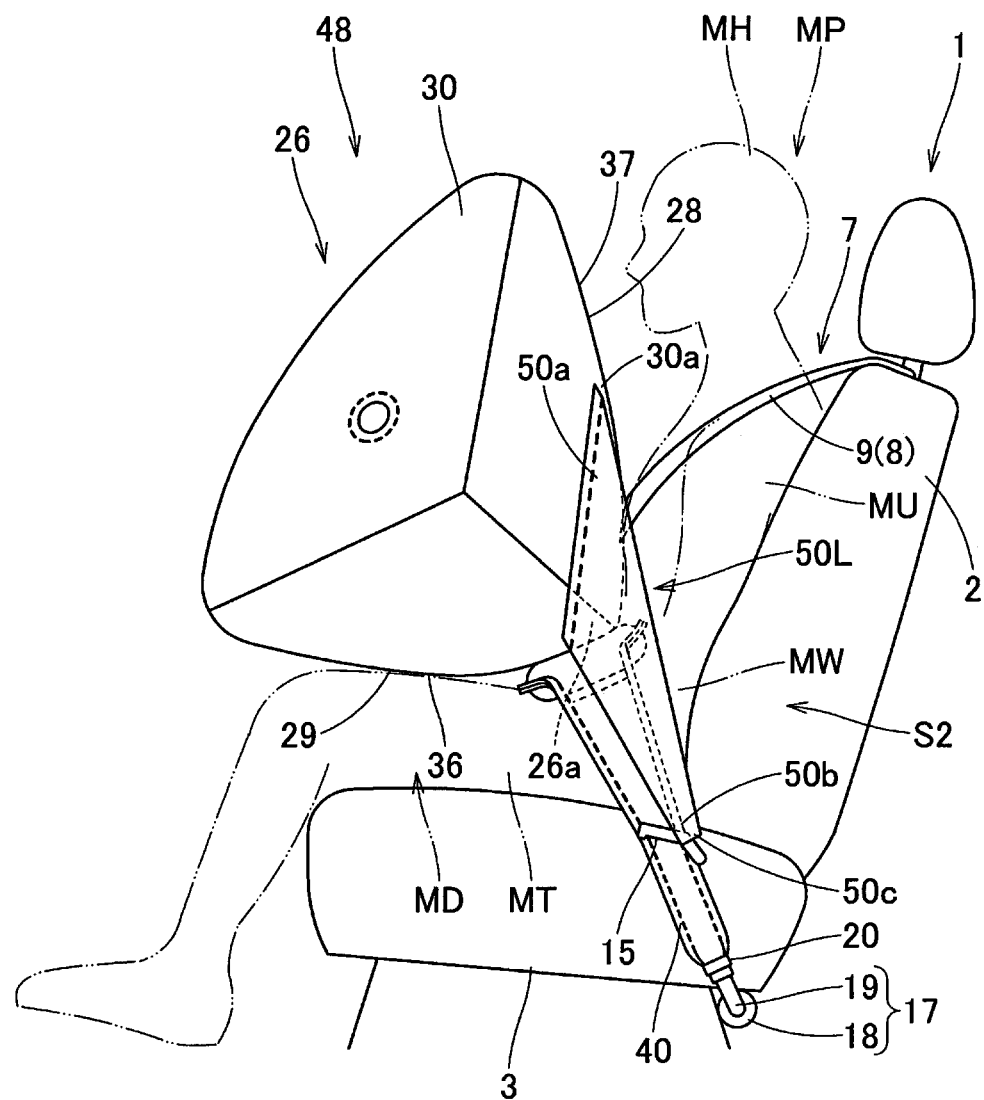
FIG. 10 is a side view of the seat in the state in which the airbag completes the inflation in the occupant protection device of the second embodiment.
Figure 11:
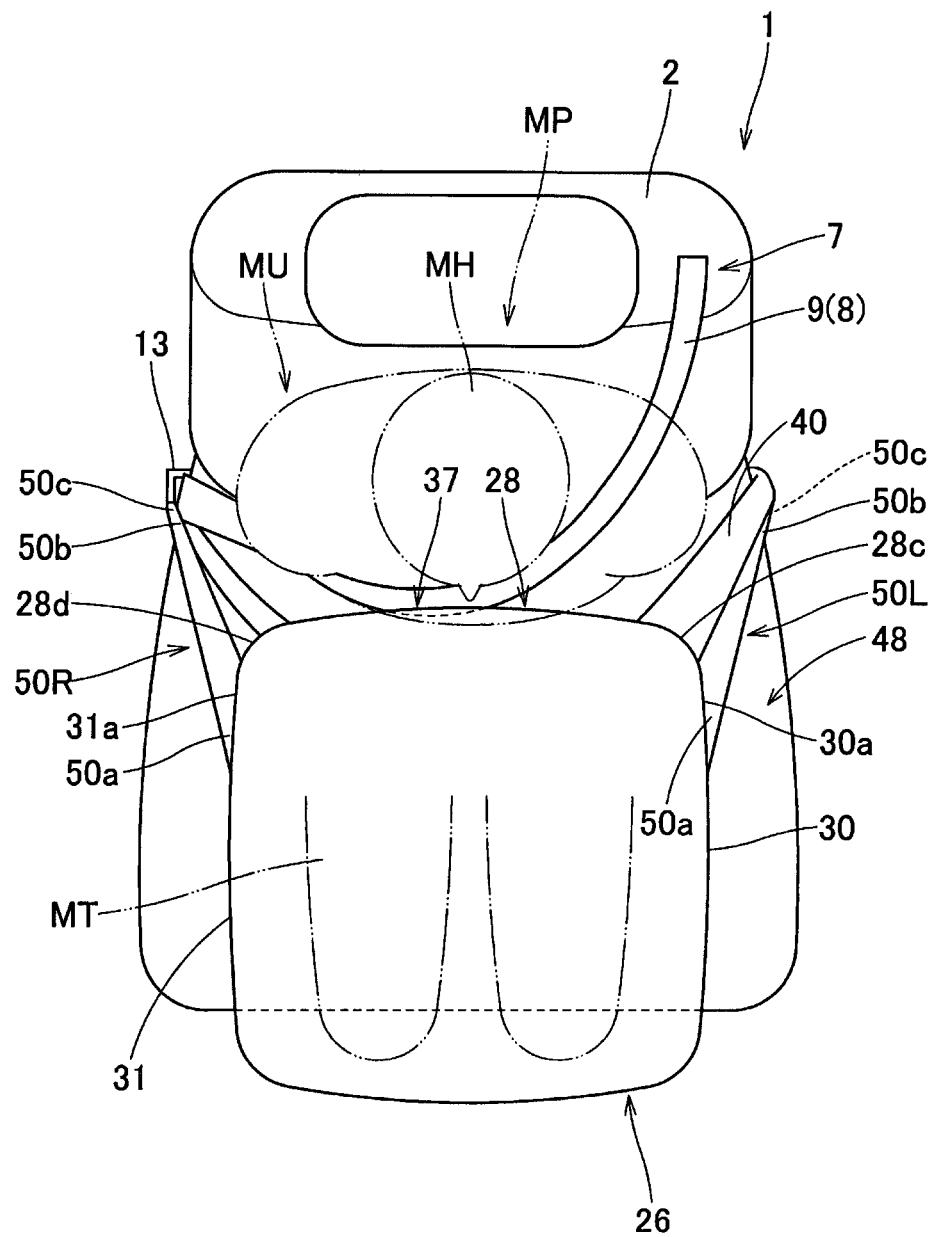
FIG. 11 is a plan view of the seat in a state in which the airbag completes the inflation in the occupant protection device of the second embodiment.

Next, an occupant protection device S2 according to a second embodiment of the invention will be described. In the occupant protection device S2 of the second embodiment, the components other than an airbag 48 have the same configuration as those of the occupant protection device S1 described above. Therefore, the same members are designated by the same reference numerals and letters and detailed description thereof will be omitted. As illustrated in FIGS. 9 to 11, the airbag 48 includes the bag body 26, the conduit portion 40 which is connected to the inflator 17 and allows inflation gas to flow into the bag body 26, a belt attachment portion (not illustrated) for connecting the bag body 26 to the lap belt 10, and regulatory tethers 50L and 50R which regulate the position of the bag body 26 when inflation is completed. In the airbag 48, the components other than the regulatory tethers 50L and 50R have the same configuration as that of the airbag 25 in the occupant protection device S1 described above. Therefore, the same members are designated by the same reference numerals and letters and detailed description thereof will be omitted.

The regulatory tethers 50L and 50R are arranged on both the left and right sides when the inflation of the bag body 26 is completed as a pair of left and right having substantially the same outer shape. In each of the regulatory tethers 50L and 50R, a base end 50a is connected to the side surface side (in the case of the embodiment, near the boundary between the backrest portion 2 and the seat portion 3 on the side surface side of the seat 1) of the bag body 26 when the inflation is completed and a tip 50b is connected to the side surface side of the seat 1 arranged rearward and downward from the base end 50a. In detail, in the regulatory tethers 50L and 50R, the base end 50a side is wide and it has a substantially triangular shape that converges toward the tip 50b side (see FIGS. 9 and 10), and further the base end 50a sides are respectively connected substantially along trailing edges 30a and 31a on the trailing edge 30a and 31a sides of the left wall portion 30 and the right wall portion 31 of the bag body 26 (see FIGS. 10 and 11). Specifically, in each of the regulatory tethers 50L and 50R, the width dimension on the up-down direction side of the base end 50a side is set to about half of the vertical width dimension on the trailing edge 30a and 31a side (that is, the rear upper wall portion 28) of the left wall portion 30 and the right wall portion 31. Further, in the regulatory tether 50L and 50R, the base ends 50a are sewn over the entire length using sutures in areas of about the lower half near the trailing edges 30a and 31a of the left wall portion 30 and the right wall portion 31 (see FIG. 10). The tip 50b of each of the regulatory tethers 50L and 50R is configured to be connected to the side surface side (specifically, near the boundary between the backrest portion 2 and the seat portion 3 on the side surface side of the seat 1) of the seat 1 arranged rearward and downward from the base end 50a as a connecting portion 50c. Specifically, in the case of the embodiment, the connecting portion 50c of the tip 50b of the regulatory tether 50L on the left side is arranged on the left side surface side of the seat 1, and as illustrated in FIG. 10, it is connected to the pressing member 15 (see FIGS. 1 and 2) which presses the outer surface of the conduit portion 40 on the tip 40a side, and further, as illustrated in FIGS. 9 and 11, the connecting portion 50c of the tip 50b of the regulatory tether 50R on the right side is configured to be connected to the buckle 13 (see FIGS. 1 and 3) of the seat belt 7 arranged on the right side surface side of the seat 1. In each of the regulatory tethers 50L and 50R, the length dimension (separation distance between the base end 50a and the tip 50b (connecting portion 50c)) is set so that when the inflation of the airbag 48 is completed, the region (lower rear portion 26a, see FIG. 10) on the rear lower end side of the bag body 26 can be arranged close to the front side of a waist MW of the occupant MP.

Also in the occupant protection device S2 of the second embodiment, when the inflation of the airbag 48 is completed, the pair of left and right regulatory tethers 50L and 50R can pull the bag body 26 which has completed the inflation to the rear side, which is the occupant MP side, and thus it is possible to prevent the bag body 26 from expanding away from the occupant MP. Specifically, in the occupant protection device S2 of the second embodiment, the regulatory tethers 50L and 50R are arranged so as to extend from both the left and right sides of the bag body 26 and the tip 50b (connecting portion 50c) is connected to the side surface side of the seat 1 arranged rearward and downward from the base end 50a. Therefore, the forward movement of a left edge 28c side and a right edge 28d side on a rear surface (upper body restraining surface 37, rear upper wall portion 28) of the bag body 26 can be accurately regulated by the regulatory tethers 50L and 50R (see FIG. 11), and thus the bag body 26 can be pulled to the rear side, which is the occupant MP side, in a well-balanced manner on the left and right. As a result, the upper body restraining surface 37 arranged on the rear surface side of the bag body 26 at the completion of inflation can be arranged so as to be close to the occupant MP side. Further, when the inflation is completed, the bag body 26 is arranged in front of the upper body MU of the occupant MP while bringing the thigh abutment surface 36 on the lower surface side into contact with the upper surface of the thigh MT of the occupant MP. Therefore, since the bag body 26 makes the thigh abutment surface 36 supported over a wide area by the thigh MT, collapse and compression are suppressed. As a result, the upper body (from the chest MB to the head MH) of the occupant MP can be accurately restrained by the upper body restraining surface 37. Further, in the occupant protection device S2 of the second embodiment, since the regulatory tethers 50L and 50R are connected to the side surface sides of the seat 1 on the tip 50b side, the position of the bag body 26 with respect to the seat 1 can also be regulated. As a result, with the bag body 26 which has completed the inflation, the waist MW of the occupant MP can also be restrained to regulate the forward movement.

Therefore, even in the occupant protection device S2 of the second embodiment, the occupant MP can be quickly protected by the airbag 48 which has completed the inflation.

Further, in the occupant protection device S2 of the second embodiment, the bag body 26 and the conduit portion 40 are attached by the belt attachment portion 42 so as to be slightly movable relative to the lap belt 10. Therefore, by the regulatory tethers 50L and 50R which extend from the left and right side surface sides of the bag body 26 and connect the tips 50b to the seat 1 side, it is also possible to perform fine-adjustment (centering) of the left and right positions of the bag body 26 with respect to the occupant MP when the inflation is completed.

Figure 12:
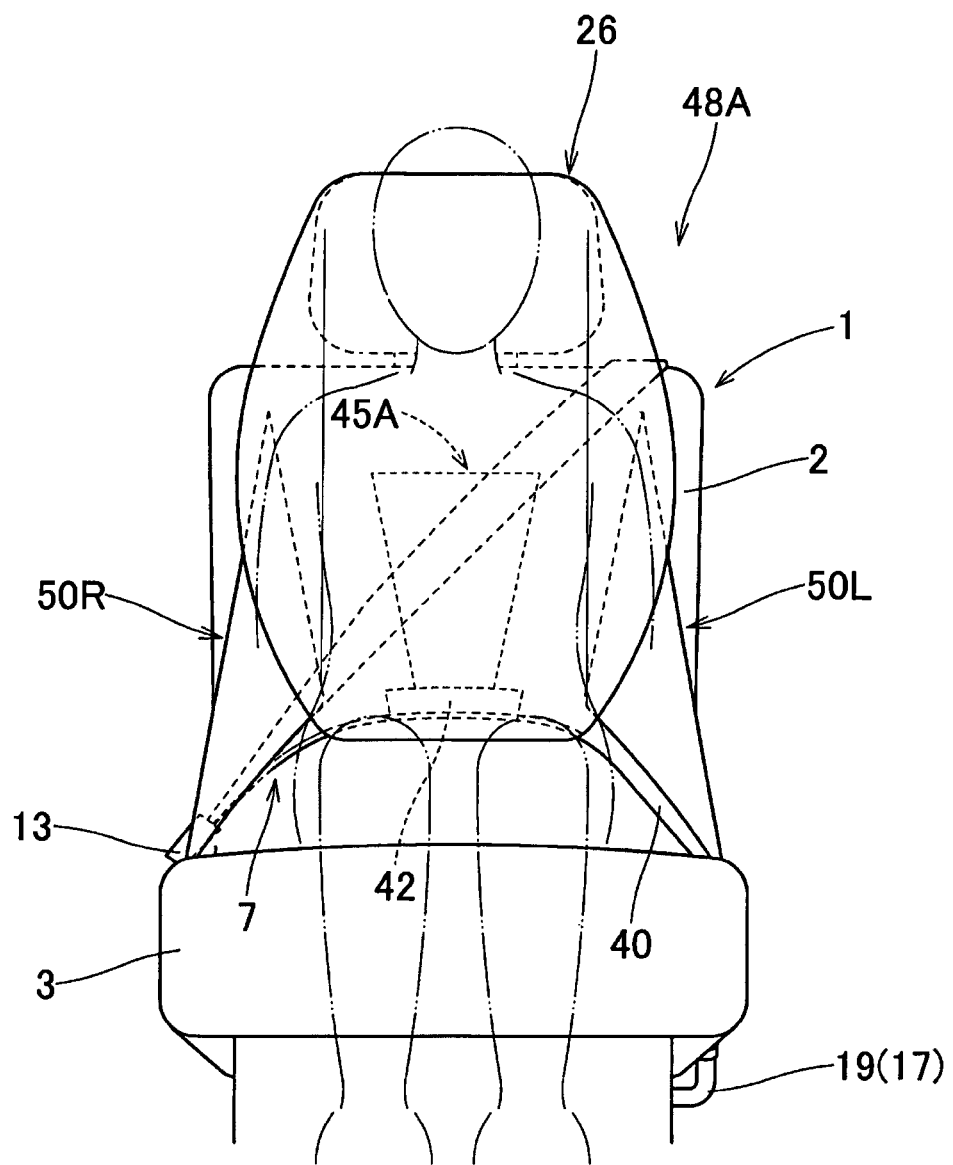
FIG. 12 is a front view of a seat in a state in which an airbag completes inflation in an occupant protection device using an airbag of another example.
Figure 13:
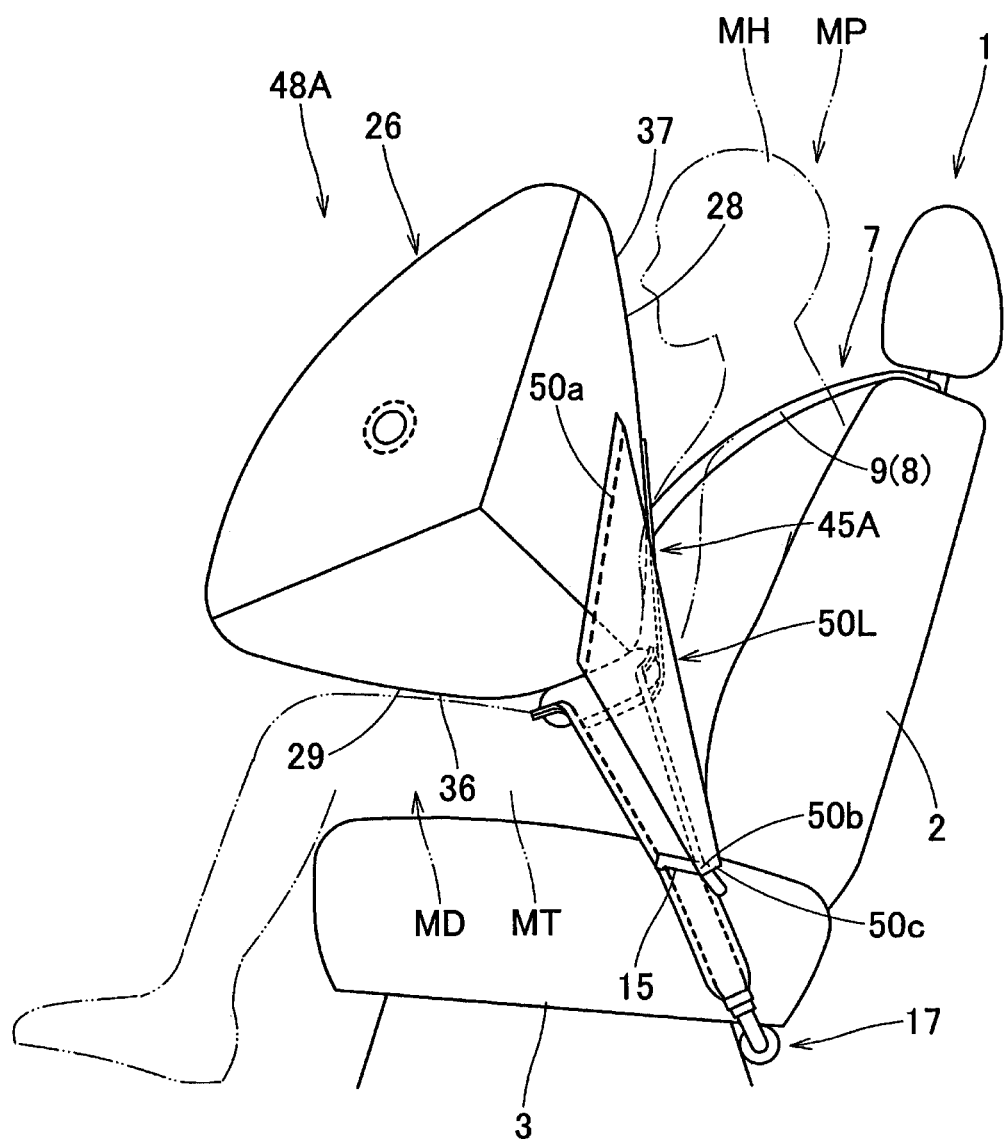
FIG. 13 is a side view of the seat in a state in which the airbag completes the inflation in the occupant protection device of FIG. 12.

Further, as an airbag 48A, as illustrated in FIGS. 12 and 13, an airbag in which in addition to the regulatory tethers 50L and 50R, a rear tether 45A is arranged on the rear surface side of the bag body 26 may be used. The rear tether 45A has the same configuration as the regulatory tether 45 arranged in the airbag 25 described above. When the airbag 48A has such a configuration, the position of the bag body 26 at the completion of inflation can be regulated by the rear tether 45A in addition to the regulation by the pair of left and right regulatory tethers 50L and 50R. In detail, in the airbag 48A with such a configuration, by the rear tether 45A connecting the base end 45a to the upper-lower intermediate portion (central portion 28b of the rear upper wall portion 28) on the rear surface side of the bag body 26, the connecting portion (central portion 28b of the rear upper wall portion 28 in the bag body 26) of the bag body 26 connecting the base end 45a can be pulled toward the lap belt 10, that is, downward. Therefore, in addition to being able to pull the bag body 26 to the rear side, which is the occupant MP side, in a well-balanced manner on the left and right by the regulatory tethers 50L and 50R extending from the left and right side surface sides, the rear tether 45A allows the upper body restraining surface 37, which is arranged on the rear surface side of the bag body 26 when the inflation is completed, to be arranged so as to be close to the occupant MP side. Therefore, in particular, it is possible to prevent the region on the upper end side of the upper body restraining surface 37 from being arranged so as to be largely separated from the occupant MP in the forward direction. As a result, in the airbag 48A, the upper body MU of the occupant MP can be quickly and stably restrained by the upper body restraining surface 37 when the inflation is completed.

Figure 14:
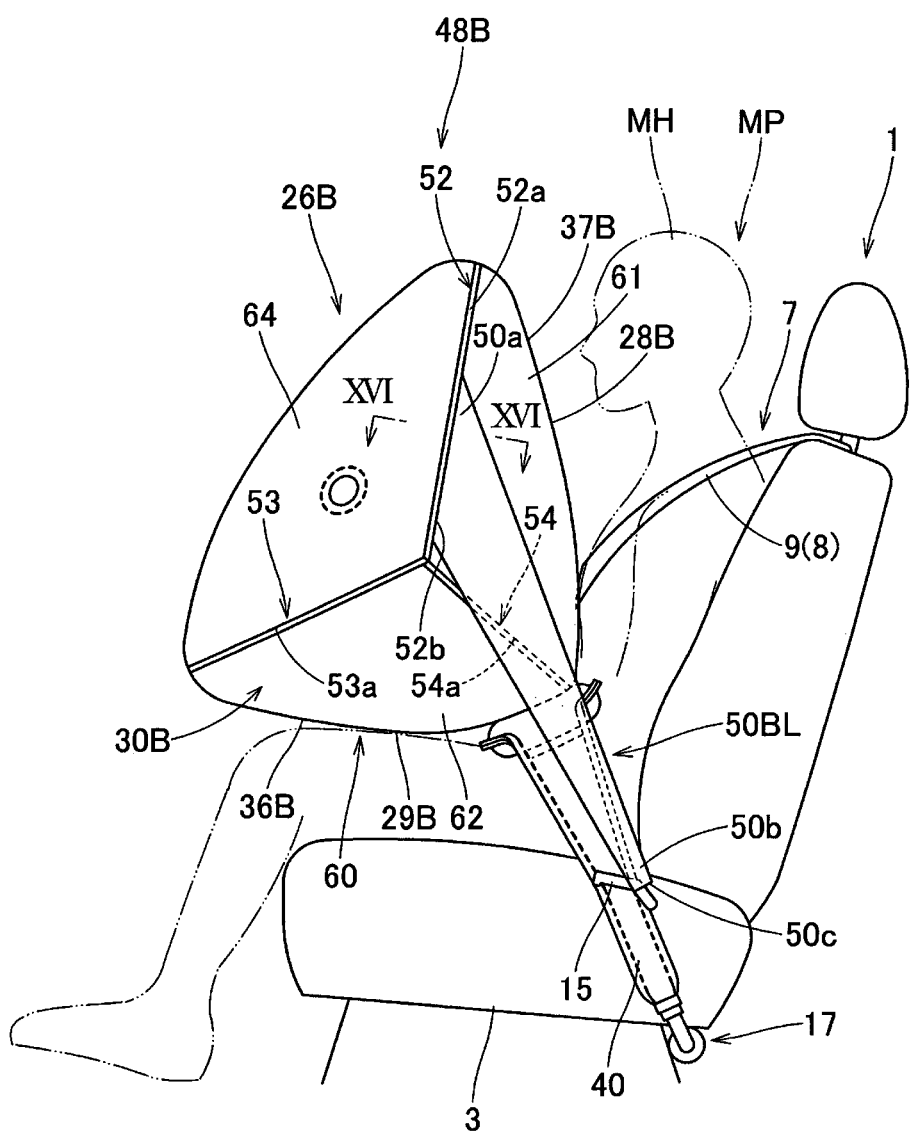
FIG. 14 is a side view of a seat in a state in which the airbag completes inflation in an occupant protection device using an airbag, which is still another example.
Figure 15:
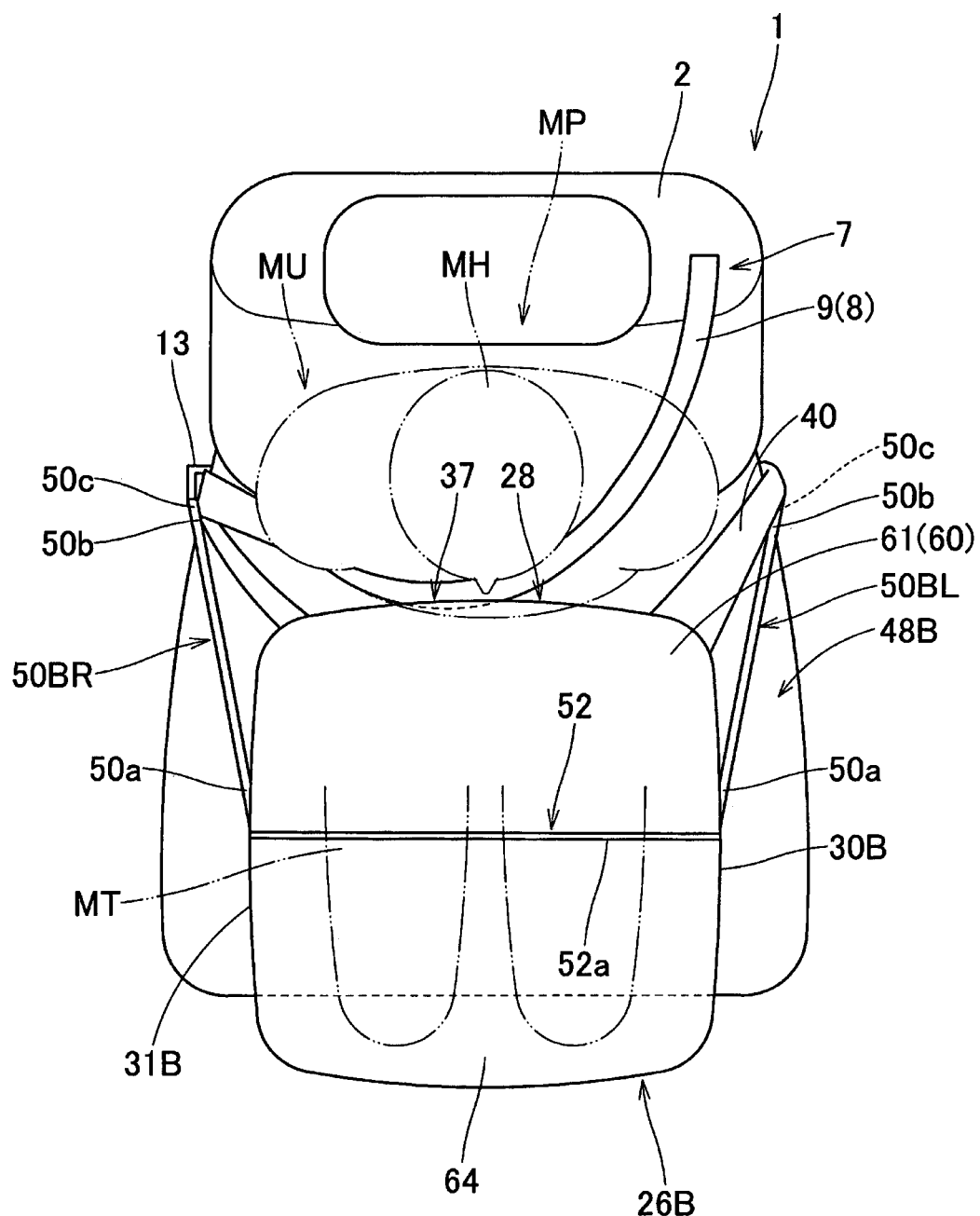
FIG. 15 is a plan view of the seat in a state in which the airbag completes inflation in the occupant protection device using the airbag of FIG. 14.

Furthermore, as the airbag 48B, those having the configurations illustrated in FIGS. 14 and 15 may be used. As similar to the airbag 48 described above, the airbag 48B includes a bag body 26B, the conduit portion 40, a belt portion (not illustrated) for connecting the bag body 26B to the lap belt 10, and regulatory tethers 50BL and 50BR which regulate the position of the bag body 26B when inflation is completed.

The bag body 26B has the same configuration as the bag body 26 of the airbag 25 in the occupant protection device S1 described above. The bag body 26B has a substantially triangular prism shape in which the axial direction is substantially along the left-right direction as the outer shape when inflation is completed. The bag body 26B includes a front wall portion 27B, which is arranged on the front side away from the occupant MP when the inflation is completed, a rear upper wall portion 28B and a rear lower wall portion 29B arranged on the occupant MP side when the inflation is completed, and a left wall portion 30B and a right wall portion 31B, which are arranged so as to face each other on the left-right direction side when the inflation is completed. In this bag body 26B as well, the rear lower wall portion 29B forms a thigh abutment surface 36B and the rear upper wall portion 28B forms a upper body restraining surface 37B.

Figure 17:
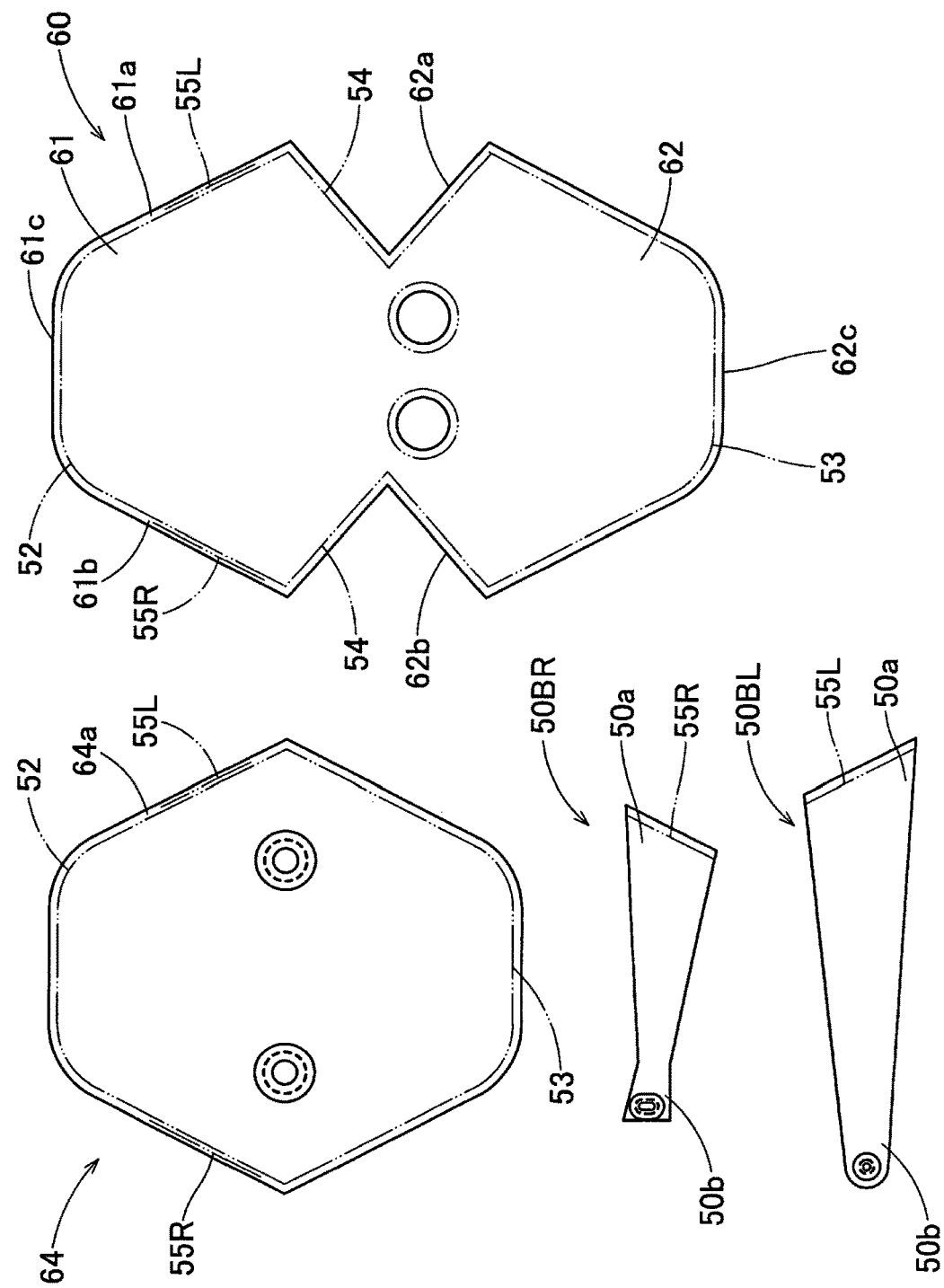
FIG. 17 is a plan view in which a base material forming a bag body in the airbag of FIG. 14 and a regulatory tether are arranged side by side.

The bag body 26B is formed by connecting the peripheral edges of base clothes having a predetermined shape to each other, and in the case of the embodiment, it is composed of two occupant side panels 60 and a front side panel 64 as illustrated in FIG. 17.

The occupant side panel 60 is arranged on the occupant MP side when the inflation is completed and forms a part from the thigh abutment surface 36B to the upper body restraining surface 37B and the occupant side panel 60 mainly includes an area from the rear upper wall portion 28B to the rear lower wall portion 29B in the bag body 26B when the inflation is completed. Specifically, the occupant side panel 60 includes a lower part 62, which mainly forms the thigh abutment surface 36B (rear lower wall portion 29B), and an upper part 61, which mainly forms the upper body restraining surface 37B (rear upper wall portion 28B). Specifically, the lower part 62 forms a rear lower wall portion 29B and a rear lower region in the left wall portion 30B and the right wall portion 31B and the upper part 61 forms a rear upper wall portion 28B and a rear upper region in the left wall portion 30B and the right wall portion 31B. Both the lower part 62 and the upper part 61 have a substantially hexagonal outer shape. The occupant side panel 60 has an outer shape such that the lower part 62 and the upper part 61 are connected by one side located on the rear end side when the inflation is completed. The lower part 62 and the upper part 61 are symmetrical with respect to a connecting portion 60a (see FIG. 17).

The front side panel 64 mainly forms the front wall portion 27B in the bag body 26B when the inflation is completed. Specifically, the front side panel 64 forms the front wall portion 27B and a front region in the left wall portion 30B and the right wall portion 31B. The outer shape of this front side panel 64 is hexagonal where, in the occupant side panel 60, rear left edges 61a and 62a and rear right edges 61b and 62b are substantially matched with the lower part 62 and the upper part 61 in an open state so as to separate remaining bound edges (front edges 61c, 62c) from each other.

Figure 16:
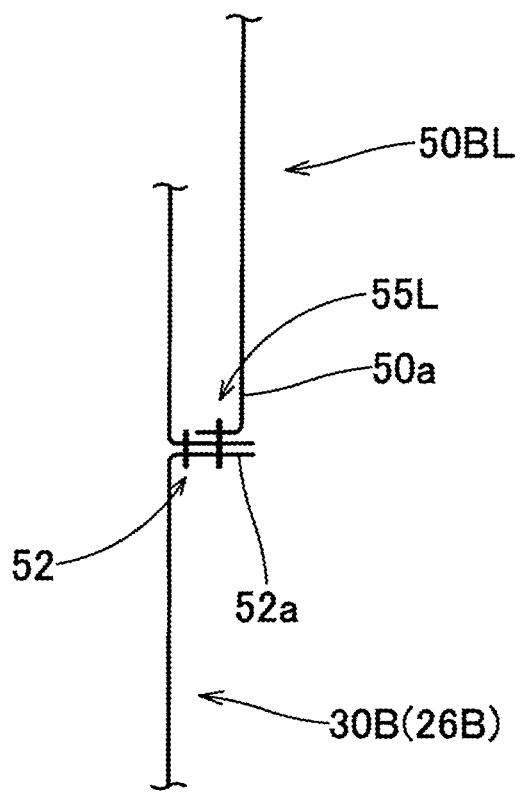
FIG. 16 is a partially enlarged cross-sectional view of the XVI-XVI portion of FIG. 14.

The bag body 26B is formed as follows (see FIGS. 14, 15, and 17). The upper part 61 and the lower part 62 in the occupant side panel 60 are folded back at the connecting portion 60a so that the peripheral edges match each other and the rear left edges 61a and 62a and the rear right edges 61b and 62b are sewn (bound) using sutures so as to respectively form lateral binding parts 54 and 54, and then the front side panel 64 in a flat unfolded state is overlaid on the upper part 61 and lower part 62 in the open state so as to separate the front edges 61c and 62c from each other, which are the remaining edges and the front edges 61c and 62c and an outer peripheral edge 64 of the front side panel 64 are sewn (bound) using sutures so as to form an upper binding part 52 and a lower binding part 53. Further, in the bag body 26B of the embodiment, the upper binding site 52, the lower binding site 53, and the lateral binding parts 54 and 54 formed by connecting the peripheral edges of the occupant side panel 60 and the front side panel 64 to each other are arranged so that binding allowances 52a, 53a, and 54a are respectively exposed on an outer peripheral surface side of the bag body 26B (see FIGS. 14 to 16).

The regulatory tether 50BL and 50BR are arranged on both the left and right sides when the inflation of the bag body 26B is completed as a pair of left and right with substantially the same outer shape. The regulatory tether 50BL and 50BR are configured so as to respectively connect the base ends 50a to left and right side surface sides in an upper side region in the upper body restraining surface 37B, which is the side surface side of the bag body 26B when the inflation is completed. Specifically, the regulatory tether 50BL and 50BR are configured such that the base end 50a is connected to the region near an end 52b of the upper binding part 52 that connects the outer peripheral edge 64a of the front side panel 64 and the front edge 61c of the upper part 61 (see FIGS. 16 and 17). Specifically, in the case of the embodiment, the base ends 50a of the regulatory tether 50BL and 50BR are sewn (bound) using a suture so that binding parts 55L and 55R are provided in the region of the binding allowance 52a of the upper binding part 52. That is, the regulatory tether 50BL and 50BR are configured such that the base ends 50a are connected to a position that is in front of and above the regulatory tethers 50L and 50R in the above-described airbag 48 and is substantially at the center of the left wall portion 30B and the right wall portion 31B in an upper-lower direction and a front-rear direction. Tips 50b of the regulatory tethers 50BL and 50BR are configured to be connected to the side surface side of the seat 1 in the same manner as the regulatory tethers 50L and 50R in the airbag 48 described above.

When the airbag 48B having such a configuration is used, the regulatory tethers 50BL and 50BR respectively connect the base ends 50a to the left and right side surfaces in the upper regions of the upper body restraining surface 37B in the bag body 26B. Therefore, the forward movement of the upper regions on the left and right side surfaces of the bag body 26B can be accurately regulated by the regulatory tethers 50BL and 50BR, and thus the bag body 26B can be pulled more stably to the rear side, which is the occupant MP side. The upper body restraining surface 37B, which is arranged on the rear surface side of the bag body 26B when the inflation is completed, can be arranged so as to be widely and stably placed close to the occupant MP side in the up-down direction.

Further, in the airbag 48B having the configuration described above, the base ends 50a of the regulatory tethers 50BL and 50BR are not bound to the peripheral walls (left wall portion 30B, right wall portion 31B) which inflate by inflowing inflation gas inside the bag body 26B, but to the region of the upper binding part 52 which connects the peripheral edges (front edge 61c and outer peripheral edge 64a) of the front side panel 64, which is a base material forming the peripheral wall (left wall portion 30B, right wall portion 31B), and the upper part 61 in the occupant side panel 60. Therefore, it is possible to stabilize the binding state of the base ends 50a of the regulatory tethers 50BL and 50BR to the bag body 26B side when the airbag 48B is inflated. As a result, with the regulatory tethers 50BL and 50BR, the position of the bag body 26B at the completion of inflation can be stably regulated. In addition, the binding parts 55L and 55R of the regulatory tethers 50BL and 50BR to the bag body 26B of the base end 50a are formed not in the part of the peripheral wall alone where there is a risk of gas leakage, but in the region of the upper binding part 52 between the inflating peripheral walls of the bag body 26B. Therefore, the risk of gas leakage can be suppressed and the base ends 50a of the regulatory tethers 50BL and 50BR can be bound to the bag body 26B. In the embodiment, the base ends 50a of the regulatory tethers 50BL and 50BR are sewn so as to form the binding parts 55L and 55R in the region of the binding allowance 52a of the upper binding part 52 after the bag body 26B is manufactured. However, the base end of the regulatory tether may be configured to be connected to the bag body by co-sewn at the time of manufacturing the bag body (when the peripheral edges of the occupant side panel and the front side panel are bound to each other).

In the airbags 25 and 48A of the embodiments, the regulatory tether 45 (rear tether 45A) has a substantially trapezoidal outer shape and has a configuration in which the base end 45a having a wide width is connected to the central portion 28b, which is substantially the vertical center of the rear upper wall portion 28 of the bag body 26, so as to substantially follow the left-right direction. However, the outer shape of the regulatory tether (rear tether) and the connection position with respect to the bag body are not limited to the embodiments. The connection position of the regulatory tether (rear tether) with respect to the bag body may be above or below the vertical center as long as the connection position of the bag body connecting the base end can be smoothly pulled toward the lap belt side when the inflation of the airbag is completed. Further, the outer shape of the regulatory tether (rear tether) is not limited to a trapezoid and may be, for example, a substantially strip shape having substantially the same width dimension over the entire length. However, in the airbags 25 and 48A of the embodiments, when the inflation is completed, the head MH of the occupant MP is received by the upper end 28a side of the rear upper wall portion 28. Therefore, it is preferable that the base end 45a of the regulatory tether 45 (rear tether 45A) be not connected to the area in contact with the head MH. Further, from the viewpoint of stably pulling the connecting portion of the bag body downward, it is preferable that the regulatory tether (rear tether) be formed with a certain width on the base end side.

Further, in the airbags 25 and 48A of the embodiments, the connecting portion 45c on the tip 45b side of the regulatory tether 45 is sewn (connected) to the belt attachment portion 42 through which the lap belt 10 is inserted. However, the connection position on the tip side of the regulatory tether is not limited to the embodiments. For example, it may be connected to the conduit portion or it may be directly connected to the lap belt side by separately providing tubular connecting means and inserting the lap belt therein.

Further, in the airbags 48 and 48A of the embodiment, the regulatory tethers 50L and 50R have a substantially triangular shape with the base end 50a side widened vertically and the base ends 50a are connected to the lower half of the areas near the trailing edges 30a and 31a at the left wall portion 30 and the right wall portion 31 of the bag body 26. Further, in the airbag 48B, the regulatory tethers 50BL and 50BR are configured to connect the base ends 50a to a position substantially at the center of the left wall portion 30B and the right wall portion 31B of the bag body 26B in the front-rear direction and the upper-lower direction. However, the outer shape of the regulatory tether and the connection position with respect to the bag body are not limited to the embodiment. For example, the base ends of the regulatory tethers may be connected to the front regions of the left wall portion and right wall portion of the bag body away from the trailing edges as long as the forward movement of both left and right edges on the rear surface of the bag body when the inflation is completed can be accurately regulated. Further, the outer shape of the regulatory tether may be substantially strip-shaped and the base ends may be connected to the upper-lower intermediate portions of the left wall portion and the right wall portion of the bag body. Considering that both the left and right edge sides on the rear surface of the bag body when the inflation is completed are stably pulled backward and downward, it is preferable that the base ends of the regulatory tethers be connected near the trailing edges of the left wall portion and the right wall portion. Also, considering that the region on the lower rear end side of the bag body when the inflation is completed can stably regulate the forward movement of the waist, it is preferable that the base end of the regulatory tether be connected to the lower end side of the side surface of the bag body.

Furthermore, in the airbags 48, 48A and 48B of the embodiment, the tips 50b (connecting portions 50c) of the regulatory tethers 50L, 50R, 50BL and 50BR are respectively connected to a buckle 3 of the seat belt 7 and the pressing member 15 which presses the tip 40a side of the conduit portion 40. However, the connecting member for connecting the tip side of the regulatory tether is not limited to the embodiment and it may be configured to be directly connected to, for example, a connecting member separately formed so as to extend from the seat.

In the embodiments, the bag body 26 or 26B in the airbag 25, 48, 48A or 48B at the completion of inflation has a substantially triangular prism shape in which the axial direction is substantially aligned in the left-right direction. Therefore, even when the occupant MP moves the upper body MU closer to the lower body MD by a large extent when the inflation of the airbag 25, 48, 48A or 48B is completed, the bag body 26 or 26B is suppressed from being compressed and collapsing so as to bring the upper body restraining surface 37 or 37B closer to the thigh abutment surface 36 or 36B. As a result, the upper body MU of the occupant MP can be accurately restrained by the bag body 26 or 26B. Further, the inflation completed shape of the airbag is not limited to those of the embodiments as long as it includes the thigh abutment surface and the upper body restraining surface. For example, as the airbag, an airbag having a shape in which the inflation completed shape when viewed from the left-right direction side is substantially L-shaped may be used.

What is claimed is:

1. An occupant protection device which protects an occupant seated in a seat, comprising:
   a seat belt; and
   an airbag which is arranged in an area of a lap belt in the seat belt which restrains a waist of the occupant when worn and inflates so as to cover a front side of the occupant when operated, wherein:
   the airbag includes a bag body which inflates so that inflation gas flows into the inside when operated and projects forward and upward and a regulatory tether which regulates a position of the bag body when inflation is completed;
   a thigh abutment surface capable of abutting on a thigh of the occupant is arranged on a lower surface side of the bag body when the inflation is completed and an upper body restraining surface capable of restraining an upper body of the occupant is arranged on a rear surface side when the inflation is completed; and
   the regulatory tethers are arranged on both left and right sides of the bag body when the inflation is completed and each of the regulatory tethers connects a base end to a side surface side of the bag body when the inflation is completed and connects a tip to a side surface side of the seat arranged rearward and downward from the base end.

2. The occupant protection device according to claim 1, wherein
   the regulatory tethers are configured to respectively connect the base ends to left and right side surface sides of the bag body in a region on an upper side of the upper body restraining surface.

3. The occupant protection device according to claim 2, wherein
   the bag body has a substantially triangular prism shape in which an axial direction is substantially along a left-right direction as an outer shape when inflation is completed and is configured to include a front wall portion, which is arranged on a front side away from the occupant when the inflation is completed, a rear upper wall portion and a rear lower wall portion arranged on the occupant side when the inflation is completed, and a left wall portion and a right wall portion, which are arranged so as to face each other on a left-right direction side when the inflation is completed,
   the upper body restraining surface is composed of the rear upper wall portion,
   the thigh abutment surface is composed of the rear lower wall portion,
   the bag body is configured to be formed by binding peripheral edges of two base materials, an occupant side panel and a front side panel, to each other,
   the occupant side panel is configured to include,
   an upper part forming the rear upper wall portion and regions on rear upper sides in the left wall portion and the right wall portion, and
   a lower part forming the rear lower wall portion and regions on rear lower sides in the left wall portion and the right wall portion,
   the front side panel forms the front wall portion and regions on front sides in the left wall portion and the right wall portion, and
   the regulatory tether is configured to bind the base end to a region of a binding part which binds peripheral edges of the front side panel and the upper part.

4. The occupant protection device according to claim 1, wherein:
   the airbag includes a rear tether which is located on a rear surface side of the bag body; and
   the rear tether connects a base end to a rear surface side of an upper-lower intermediate portion of the bag body when the inflation is completed and connects a tip extending downward from the base end to the lap belt side and a length dimension is set a dimension in which a connecting portion connecting the base end of the bag body can be pulled toward the lap belt side.

* * * * *